(12) United States Patent
Josiam et al.

(10) Patent No.: US 9,681,335 B2
(45) Date of Patent: Jun. 13, 2017

(54) METHODS FOR BANDWIDTH EFFICIENT OPERATIONS IN WIRELESS LOCAL AREA NETWORKS

(71) Applicant: Samsung Electronics Co., Ltd., Suwon-si, Gyeonggi-do (KR)

(72) Inventors: Kaushik M. Josiam, Dallas, TX (US); Rakesh Taori, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 14/702,411

(22) Filed: May 1, 2015

(65) Prior Publication Data

US 2015/0373587 A1  Dec. 24, 2015

Related U.S. Application Data

(60) Provisional application No. 62/014,490, filed on Jun. 19, 2014.

(51) Int. Cl.
*H04W 72/04* (2009.01)
*H04W 28/20* (2009.01)
(Continued)

(52) U.S. Cl.
CPC ............ *H04W 28/20* (2013.01); *H04L 5/001* (2013.01); *H04L 5/0028* (2013.01); *H04L 5/0064* (2013.01); *H04L 5/0092* (2013.01); *H04L 5/0023* (2013.01); *H04L 5/0041* (2013.01); *H04W 48/12* (2013.01); *H04W 74/002* (2013.01); *H04W 74/0816* (2013.01); *H04W 84/12* (2013.01)

(58) Field of Classification Search
CPC . H04W 28/20; H04W 48/12; H04W 74/0816; H04W 84/12; H04W 74/002; H04L 5/001; H04L 5/0005; H04L 5/0058; H04L 5/0028; H04L 5/0064; H04L 5/0092; H04L 5/0023; H04L 5/0041; H04B 1/126
USPC ................. 370/338, 329, 311; 455/63.1, 522
See application file for complete search history.

(56) References Cited

U.S. PATENT DOCUMENTS 7,020,472 B2 *  3/2006  Schmidt ................ H04L 5/0005
                                                            370/329
7,382,823 B1    6/2008  Cory
(Continued)

FOREIGN PATENT DOCUMENTS

WO    WO 03/073641 A2    9/2003

OTHER PUBLICATIONS

International Search Report dated Oct. 15, 2015 in connection with International Application PCT/KR2015/006192; 3 pages.
(Continued)

*Primary Examiner* — Afsar M Qureshi

(57) ABSTRACT

A method of establishing a data transmission bandwidth between a transmitting node and a receiving node is provided. The method includes sending a request to send (RTS) message from a transmitting node to a receiving node, the RTS message indicating a data transmission bandwidth to be considered for use in subsequent data transmission and establishing a negotiated data transmission bandwidth comprising multiple channels, wherein each channel comprises a 20 MHz bandwidth, and wherein the multiple channels are at least one of contiguous and non-contiguous in frequency.

20 Claims, 15 Drawing Sheets

(51) Int. Cl.
*H04L 5/00* (2006.01)
*H04W 84/12* (2009.01)
*H04W 74/00* (2009.01)
*H04W 74/08* (2009.01)
*H04W 48/12* (2009.01)

(56) References Cited

U.S. PATENT DOCUMENTS

| | | | |
|---|---|---|---|
| 2011/0249579 A1 | 10/2011 | Hu et al. | |
| 2011/0319120 A1* | 12/2011 | Chen | H04W 52/367 |
| | | | 455/522 |
| 2012/0163360 A1* | 6/2012 | Cheong | H04W 48/16 |
| | | | 370/338 |
| 2012/0287915 A1* | 11/2012 | Cheong | H04L 1/004 |
| | | | 370/338 |
| 2013/0003668 A1* | 1/2013 | Xiao | H04L 5/001 |
| | | | 370/329 |
| 2013/0102254 A1* | 4/2013 | Cyzs | H04B 1/126 |
| | | | 455/63.1 |
| 2013/0155953 A1 | 6/2013 | Chu et al. | |
| 2014/0112273 A1* | 4/2014 | Aboul-Magd | H04L 5/0058 |
| | | | 370/329 |
| 2014/0307602 A1* | 10/2014 | Seok | H04W 52/0216 |
| | | | 370/311 |

OTHER PUBLICATIONS

International Written Opinion dated Oct. 15, 2015 in connection with International Application PCT/KR2015/006192; 6 pages.

* cited by examiner

METHODS FOR BANDWIDTH EFFICIENT OPERATIONS IN WIRELESS LOCAL AREA NETWORKS

CROSS-REFERENCE TO RELATED APPLICATION(S) AND CLAIM OF PRIORITY

The present application claims priority to U.S. Provisional Patent Application Ser. No. 62/014,490, filed Jun. 19, 2014, entitled "METHODS FOR BANDWIDTH EFFICIENT OPERATIONS IN WIRELESS LOCAL AREA NETWORKS". The content of the above-identified patent document is incorporated herein by reference.

TECHNICAL FIELD

The present application relates generally to wireless local area networks, and more specifically, to channel bonding in wireless local area networks.

BACKGROUND

In some wireless local area networks, operations that deal with aggregation of bandwidth across multiple channels is inefficient. For example, in some 802.11ac systems, the channel bonding procedure allows for bonding and operating only 40 MHz, 80 MHz and 160 MHz channel bandwidths. However, because 802.11 systems must also allow for legacy devices that operate mostly at 20 MHz and 40 MHz bandwidths, when legacy devices are present in dense deployments, it is challenging to find 40 MHz, 80 MHz and 160 MHz of bandwidth that is free and available for transmission. Further, dense environments are often not well suited for contiguous bonding of channels and the bandwidth availability may change quite dynamically.

SUMMARY

This disclosure provides an apparatus and method for bandwidth efficient operations in wireless local area networks.

In a first embodiment, method of establishing a data transmission bandwidth between a transmitting node and a receiving node is provided. The method includes sending a request to send (RTS) message from a transmitting node to a receiving node, the RTS message indicating a data transmission bandwidth to be considered for use in subsequent data transmission and establishing a negotiated data transmission bandwidth comprising multiple channels, wherein each channel comprises a 20 MHz bandwidth, and wherein the multiple channels are at least one of contiguous and non-contiguous in frequency.

In a second embodiment, a node is provided. The node includes processing circuitry configured to transmit at least one of a request to send (RTS) message indicating a data transmission bandwidth to be considered for use in subsequent data transmission and a clear to send (CTS) message in response to a RTS message, wherein the CTS message indicates the channel bandwidth considered for use in data transmission and wherein the indications of the data transmission bandwidth and the channel bandwidth are indicated in a seven bit scrambling initialization sequence.

In a third embodiment, a method is provided. The method includes indicating an aggregation level to all nodes capable of transmitting and receiving data and at least one of using the aggregation level to indicate a minimum bandwidth segment that should be individually indicated when negotiating a channel bandwidth and indicating the aggregation level along with positions of secondary channels relative to a primary channel.

In a fourth embodiment, a method for constructing an orthogonal frequency division multiplexing (OFDM) symbol for data transmission over a negotiated channel bandwidth containing multiple channels each of 20 MHz bandwidth that can be non-contiguous in frequency is provided. The method includes providing each 20 MHz channel with 64 subcarriers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 20, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
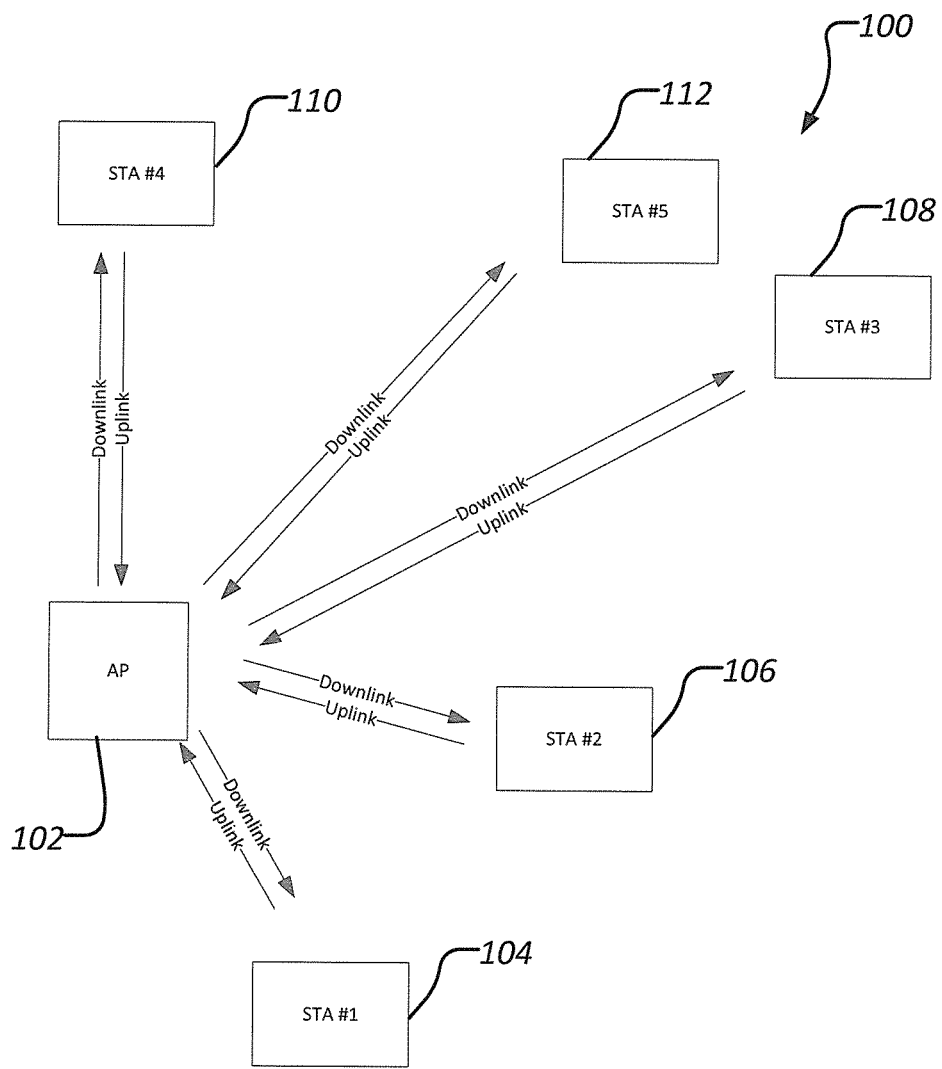
FIG. 1 illustrates an wireless network in accordance with this disclosure.

FIG. 1 illustrates an example wireless network 100 according to this disclosure. The embodiment of the wireless network 100 shown in FIG. 1 is for illustration only. Other embodiments could be used without departing from the scope of this disclosure.

The wireless network 100 includes an access point (AP) 102 and a plurality of stations (STAs) configured to wirelessly communicate with the AP 102. In the example illustrated in FIG. 1, the wireless network 100 includes a first station 104, a second station 106, a third station 108, a fourth station 110, and a fifth station 112. However, the wireless network 100 can include more or fewer stations. The wireless network 100 can be configured according to one or more 802.11 based communication standards. Each station transmits uplink signals to the AP 102 and receives downlink signals from the AP 102.

Depending on the network type, other well-known terms may be used instead of AP, such as "eNodeB" or "eNB," or "base station." For the sake of convenience, the term "AP" is used in this patent document to refer to network infrastructure components that provide wireless access to remote terminals. Also, depending on the network type, other well-known terms may be used instead of STA, such as "user equipment" or "UE," "mobile station," "subscriber station," "remote terminal," "wireless terminal," or "user device." For the sake of convenience, the term "STA" is used in this patent document to refer to remote wireless equipment that wirelessly accesses an AP, whether the STA is a mobile device (such as a mobile telephone or smartphone) or is normally considered a stationary device (such as a desktop computer or vending machine).

The AP 102 provides wireless fidelity (Wi-Fi) access, such as 802.11 based communications, to a network, such as the Internet, for the first STA 104, the second STA 106, the third STA 108, the fourth STA 110, and the fifth STA 112. The AP 102 can be located one of: a small business (SB); an enterprise (E); in a WiFi hotspot (HS); in a first residence (R); in a second residence (R); and a mobile device (M) like a cell phone, a wireless laptop, a wireless PDA, or the like. In certain embodiments, one or more of the AP 102 or the STAs 104, 106, 108, 112 and 114 are configured to support channel bonding in wireless local area network systems.

Figure 2:
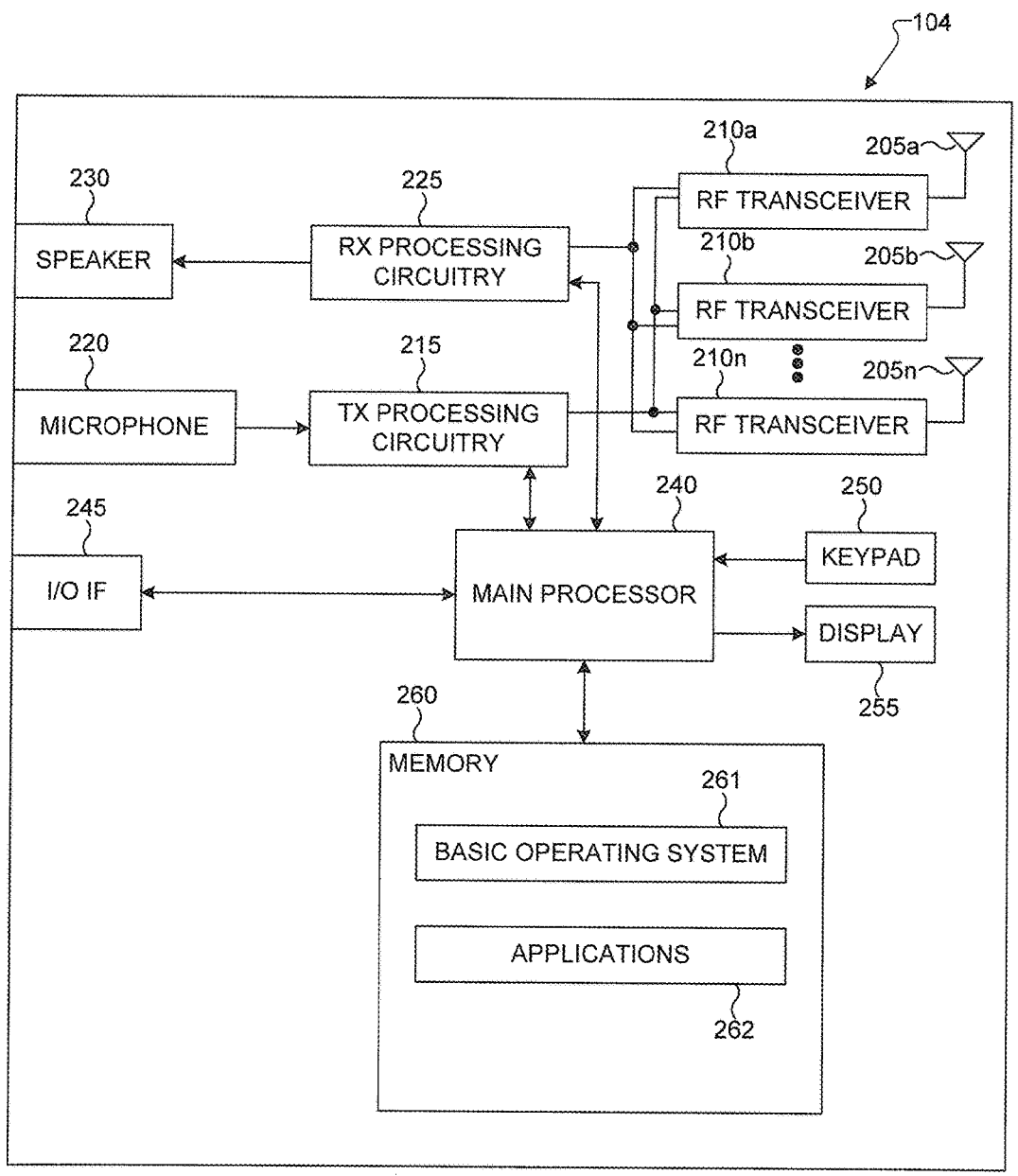
FIG. 2 illustrates a station in accordance with this disclosure.

FIG. 2 illustrates an example STA 104 according to this disclosure. The embodiment of the STA 104 illustrated in FIG. 2 is for illustration only, and the STAs 106-112 of FIG. 1 could have the same or similar configuration. However, STAs come in a wide variety of configurations, and FIG. 2 does not limit the scope of this disclosure to any particular implementation of a STA.

The STA 104 includes multiple antennas 205a-205n, a radio frequency (RF) transceivers 210a-210n, transmit (TX) processing circuitry 215, a microphone 220, and receive (RX) processing circuitry 225. The TX processing circuitry 215 and RX processing circuitry 225 are respectively coupled to each of the RF transceivers 210a-210n, for example, coupled to RF transceiver 210a, RF transceiver 210b through to a $N^{th}$ RF transceiver 210n, which are coupled respectively to antenna 205a, antenna 205b and an $N^{th}$ antenna 205n. In certain embodiments, the STA 104 includes a single antenna 205a and a single RF transceiver 210a. The STA 104 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceivers 210a-210n receive, from respective antennas 205a-205n, an incoming RF signal transmitted by an AP 102 of the network 100. The RF transceivers 210a-210n down-convert the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceivers 210a-210n receive the outgoing processed baseband or IF signal from the TX processing circuitry 215 and up-converts the baseband or IF signal to an RF signal that is transmitted via one or more of the antennas 205a-205n.

The main processor 240 can include one or more processors or other processing devices and execute the basic OS program 261 stored in the memory 260 in order to control the overall operation of the STA 104. For example, the main processor 240 could control the reception of forward channel signals and the transmission of reverse channel signals by the RF transceivers 210a-210n, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260, such as operations to support beam refinement in mmWave wireless systems. The main processor 240 can move data into or out of the memory 260 as required by an executing process. In some embodiments, the main processor 240 is configured to execute the applications 262 based on the OS program 261 or in response to signals received from AP 102 or an operator. The main processor 240 is also coupled to the I/O interface 245, which provides the STA 104 with the ability to connect to other devices such as laptop computers and handheld computers. The I/O interface 245 is the communication path between these accessories and the main controller 240.

The main processor 240 is also coupled to the keypad 250 and the display unit 255. The operator of the STA 104 can use the keypad 350 to enter data into the STA 104. The display 255 may be a liquid crystal display or other display capable of rendering text and/or at least limited graphics, such as from web sites.

The memory 260 is coupled to the main processor 240. Part of the memory 260 could include a random access memory (RAM), and another part of the memory 260 could include a Flash memory or other read-only memory (ROM).

Although FIG. 2 illustrates one example of STA 104, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the STA 104 configured as a mobile telephone or smartphone, STAs could be configured to operate as other types of mobile or stationary devices.

Figure 3:
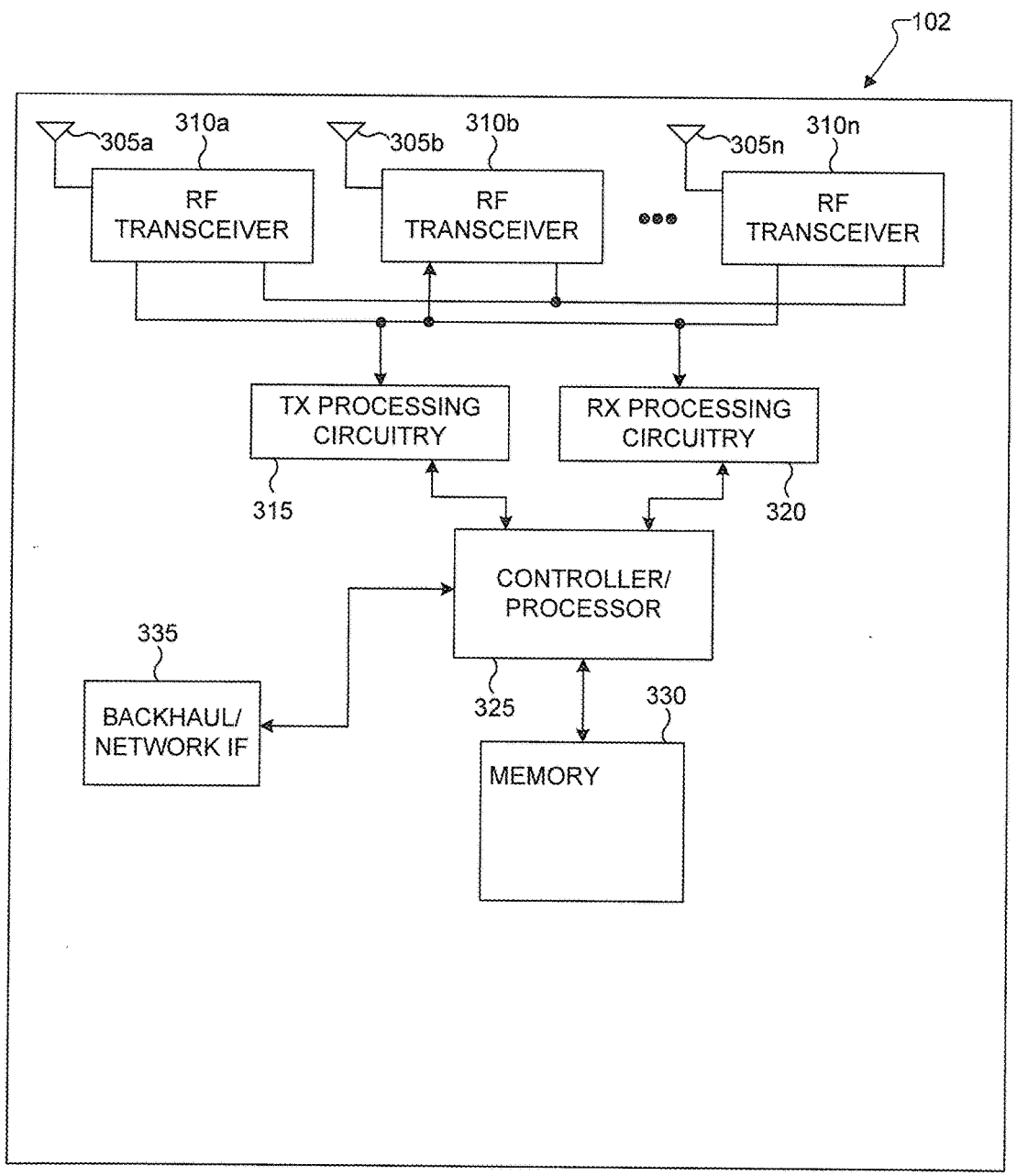
FIG. 3 illustrates an access point in accordance with this disclosure.

FIG. 3 illustrates an example AP according to this disclosure. The embodiment of the AP 102 shown in FIG. 3 is for illustration only, and other APs in embodiments of the present disclosure could have the same or similar configuration. However, APs come in a wide variety of configurations, and FIG. 3 does not limit the scope of this disclosure to any particular implementation of an AP.

The AP 102 includes multiple antennas 305a-305n, multiple RF transceivers 310a-310n, transmit (TX) processing circuitry 315, and receive (RX) processing circuitry 320. The TX processing circuitry 315 and RX processing circuitry 320 are respectively coupled to each of the RF transceivers 310a-310n, for example, coupled to RF transceiver 310a, RF transceiver 310b through to a $N^{th}$ RF transceiver 310n, which are coupled respectively to antenna 305a, antenna 305b and an $N^{th}$ antenna 305n. In certain embodiments, the AP 102 includes a single antenna 305a and a single RF transceiver 310a. The AP 102 also includes a controller/processor 325, a memory 330, and a backhaul or network interface 335.

The RF transceivers 310a-310n receive, from the antennas 305a-305n, incoming RF signals, such as signals transmitted by STAs or other APs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 425 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the AP 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. Any of a wide variety of other functions could be supported in the AP 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the AP 102 to communicate with other devices or systems over a backhaul connection or over a network. The interface 335 could support communications over any suitable wired or wireless connection(s). When the AP 102 is implemented as an access point, the interface 335 could allow the AP 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the AP 102 (implemented using the RF transceivers 310a-310n, TX processing circuitry 415, and/or RX processing circuitry 320) support channel bonding in wireless local area network systems. The transmit and receive paths of the AP 102 are configured to support channel bonding in wireless local area network systems.

Although FIG. 3 illustrates one example of an AP 102, various changes may be made to FIG. 3. For example, the AP 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the AP 102 could include multiple instances of each (such as one per RF transceiver).

Figure 4:
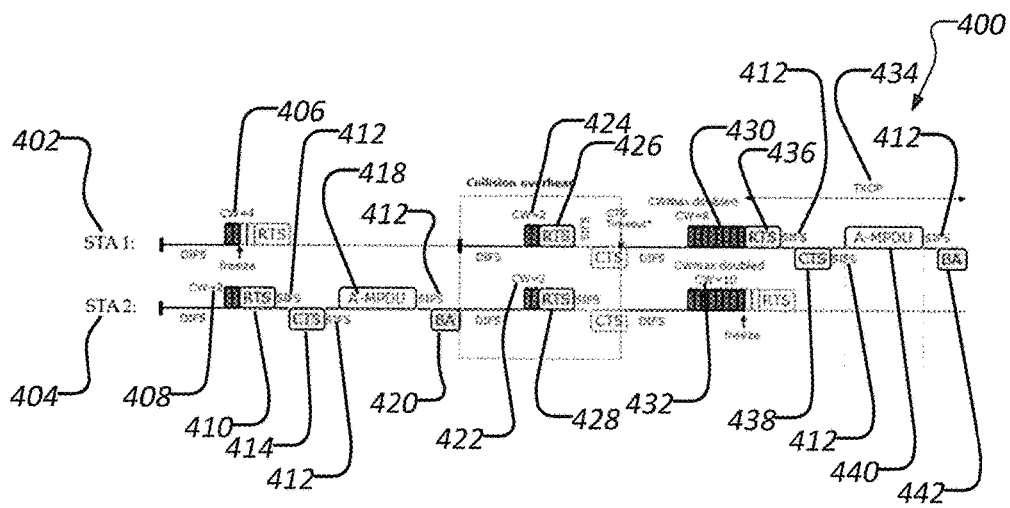
FIG. 4 illustrates a channel access procedure in IEEE 802.11 systems in accordance with this disclosure.

FIG. 4 illustrates an example channel access procedure in IEEE 802.11 systems according to this disclosure. The embodiment of the channel access procedure shown in FIG. 4 is for illustration only, and other channel access procedures in embodiments of the present disclosure could have the same or similar configuration.

In the example shown in FIG. 4, in the channel access procedure 400, a first station STA 1 402 and a second station STA 2 404 compete for channel access. In the channel access procedure 400, STA 1 402 has drawn a contention window (CW) 406 equal to 4 while STA 2 404 has drawn a CW 408 equal to 2 from a set of numbers that ranges from 0 to $CW_{min}$, where $CW_{min}$ is a parameter that is defined in the standard and depends on the access category of the data for which the channel is being contended. Both begin countdown once a random number is drawn. Although, it is shown that STA 1 402 and STA 2 404 choose the random number at the same time here, this is just for illustration. They need not be synchronized. After STA 2 404 waits for a countdown of 2, STA 2 404 gains control of the channel and transmits a request to send (RTS) 410. Next, the STA 2 404 waits for a fixed time period defined as short inter-frame space (SIFS) 412 followed by receiving a clear to send (CTS) 414 from an access point. After the STA 2 404 receives the CTS 414, the STA 2 404 waits a SIFS 412 and thereafter transmits an aggregated medium access control (MAC) protocol data unit (A-MPDU) 418. After transmitting the A-MPDU 418, the STA 2 404 waits a SIFS 412 before receiving a block acknowledgement (BA) 420 from the access point. Next, the STA 2 404 draws a new random CW 422 equal to 2. Because STA 1 402 has decremented to CW 424 equal to 2 and STA 2 404 has CW 422 equal to two, both STA 1 402 and STA 2 404 attempt to access the channel by transmitting RTSs 426, 428 simultaneously. The simultaneous transmission results in a collision. As a result of the collision, the access point does not transmit a CTS causing a CTS timeout to occur for each of STA 1 402 and STA 2 404. Next each of STA 1 402 and STA 2 404 draw new random numbers from a set of numbers that ranges from 0 to double that of $CW_{min}$. In this case, STA 1 402 has a CW 430 equal to eight and STA 2 404 has a CW 432 equal to ten. After counting CW 430 down to zero from eight, STA 1 402 accesses the channel to perform transmit operation (TXOP) 434. TXOP 434 includes transmitting RTS 436, waiting a SIFS 412, receiving a CTS 438, waiting another SIFS 412, transmitting an A-MPDU 440, waiting still another SIFS 412, and receiving a BA 442.

Figure 5:
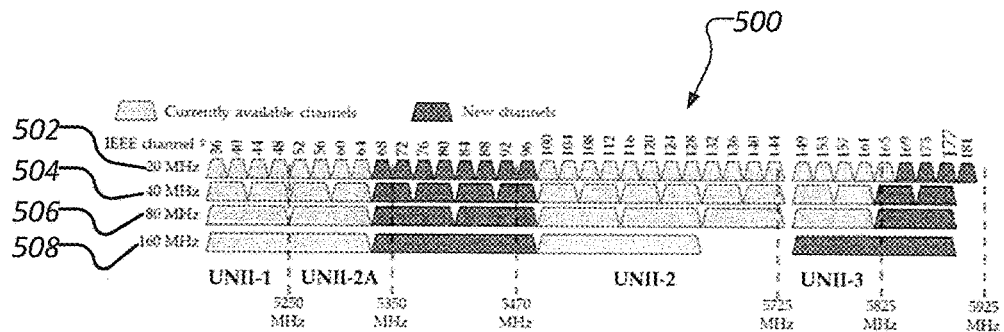
FIG. 5 illustrates a channel distribution for a 5 GHz UNII band in accordance with this disclosure.

FIG. 5 illustrates an example of a channel distribution for the 5 GHz UNIT band according to this disclosure. The embodiment of the channel distribution shown in FIG. 5 is for illustration only, and other available channel distributions in embodiments of the present disclosure could have the same or similar configuration.

The 5 GHz UNII band 500 includes frequencies in the range of about 5.15 GHz to about 5.925 GHz. The 5 GHz UNII band 500 can comprise as many as thirty-seven channels each having a 20 MHz bandwidth as shown in the 20 MHz row 502, eighteen channels each having a 40 MHz bandwidth as shown in the 40 MHz row 504, nine channels each having an 80 MHz bandwidth as shown in the 80 MHz row 506, and four channels each having a 160 MHz bandwidth as shown in the 160 MHz row 508. IEEE 802.11ac operation is defined only for the 5 GHz UNII band whose frequencies are shown in FIG. 5. IEEE 802.11ac also defines channel operations in 20, 40, 80 and 160 MHz bandwidths. Additionally, a non-contiguous 160 MHz operation, defined as 80+80, is also optionally supported by the standard. IEEE 802.11n defines operations both in the 5 GHz UNII band and 2.4 GHz ISM bands and allows 20 MHz and 40 MHz operations. While the 5 GHz UNIT band is shown in FIG. 5, the systems and methods disclosed herein are not limited to utilization on the 5 GHz UNII band. Different versions of the IEEE 802.11 standards work in unlicensed bands. While most IEEE 802.11 versions operate in the 2.4 GHz ISM band and the 5 GHz UNIT band, there are also versions of the standard being defined for operation below 1 GHz, such as, for example, IEEE 802.11ah and IEEE 802.11af. The systems and methods disclosed herein are specifically contemplated as being utilized in any unlicensed band where IEEE 802.11 systems are likely to be deployed, including any bands that are likely to be considered for unlicensed operations in the future, for example, 3.5 GHz bands.

Figure 6:
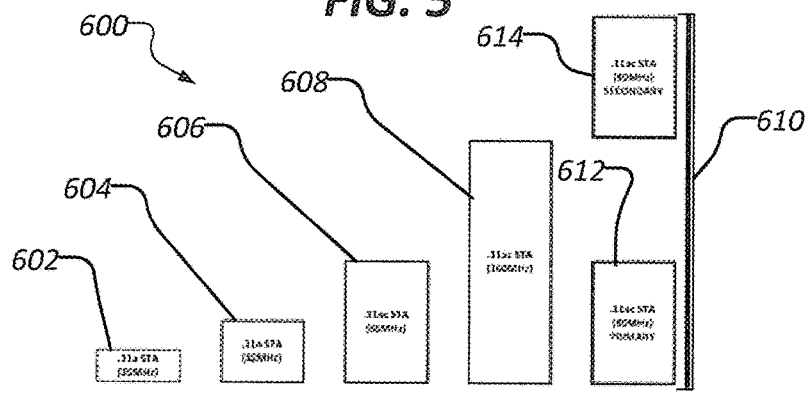
FIG. 6 illustrates IEEE 802.11 devices in accordance with this disclosure.

FIG. 6 illustrates example IEEE 802.11 devices according to this disclosure. The embodiments of the IEEE 802.11 devices shown in FIG. 6 is for illustration only, and other available IEEE 802.11 devices in embodiments of the present disclosure could have the same or similar configuration.

IEEE 802.11 devices 600 are capable of supporting different bandwidths. An IEEE 802.11a station 602 is capable of utilizing a bandwidth of 20 MHz. An IEEE 802.11a station 604 is capable of utilizing a bandwidth of 40 MHz. An IEEE 802.11ac station 606 is capable of utilizing a bandwidth of 80 MHz. An IEEE 802.11ac station 608 is capable of utilizing a contiguous bandwidth of 160 MHz. An IEEE 802.11ac station 610 is capable of utilizing a non-contiguous bandwidth of 160 MHz which includes a primary bandwidth portion 612 of 80 MHz and a secondary bandwidth portion 614 of 80 MHz. Embodiments of the present disclosure provide a transmitter that can allocate multiple channels within a bandwidth, which has been sensed as being free, irrespective of continuity. That is, according to embodiments of the present disclosure, the transmitter is able to allocate multiple contiguous channels and is able to allocate multiple non-contiguous channels. The channels thus allocated can be addressed to a single STA or multiple STAs. In the descriptions that follow, allocations of multiple contiguous channels and multiple non-contiguous channels that are sensed free is termed channel bonding or channel aggregation. Both the terms bonding and aggregation can be used interchangeably.

Figure 7:
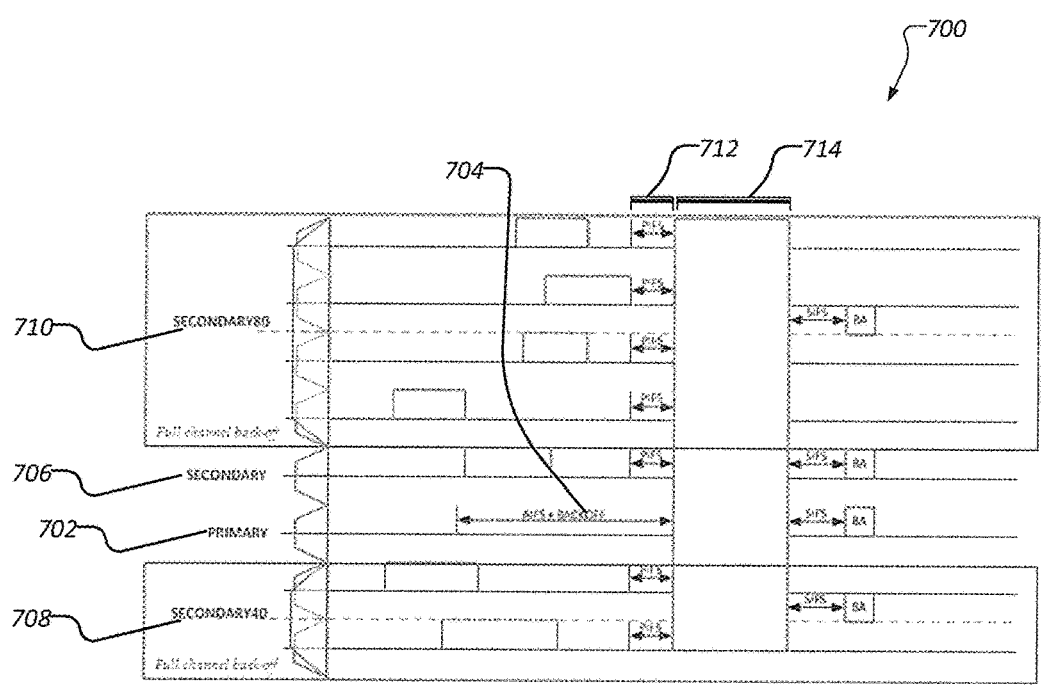
FIG. 7 illustrates a PIFS based channel bonding and access procedure in IEEE 802.11 in accordance with this disclosure.

FIG. 7 illustrates an example PIFS based channel bonding and access procedure in IEEE 802.11 systems according to this disclosure. The example of the PIFS based channel bonding and access procedure shown in FIG. 7 is for illustration only, and other PIFS based channel bonding and access procedures in embodiments of the present disclosure could have the same or similar configuration.

The PIFS based channel bonding procedure 700 is based on extending the channel sensing mechanism to all bands that are being considered for channel bonding. For example, to aggregate 160 MHz, the primary channel 702 goes through the full channel sensing protocol that includes an arbitration inter-frame space (AIFS)+back-off procedure 704. The AIFS+back-off procedure 704 is a carrier sense multiple access (CSMA) procedure during which the primary channel 702 must be sensed free. The secondary channel 706 having a bandwidth of 20 MHz, secondary-40 channel 708 and secondary-80 channel 710, are not held to the same sensing requirements as the primary channel 702. Instead, it is required that the secondary channels 706, 708, 710 are sensed free for a point coordination function inter-frame space (PIFS) duration 712 just before a back-off timer of the AIFS+back-off procedure 704 expires and the channel is sensed free. When the primary channel 702 and the secondary channels 706, 708 are all sensed free at the source during the PIFS duration 712, a TXOP 714 is initiated and includes transmitting a request to send (RTS) message to a destination, such as an access point. If the destination also senses the secondary channels 706, 708, 710 indicated in the RTS are free for a PIFS duration before the RTS was received, then the destination responds with a clear to send (CTS) message after which data transmission can begin. The RTS and CTS are present in all of the primary and secondary channels 702, 706, 708, 710 so that all APs and STAs that communicate using the primary and secondary channels 702, 706, 708, 710 can set their network allocation vectors (NAVs) using the RTS and remain silent for the duration of data transmission. In addition to the primary channel 702 and secondary channel 706 that are each 20 MHz wide, the secondary-40 channel 708 (40 MHz) and secondary-80 channel 710 (80 MHz) are considered as separate units and a full channel back-off is completed if any of the 20 MHz segments of the secondary channels 706, 708, 710 are sensed as busy. Accordingly, if even one of the two 20 MHz segments of the secondary-40 channel 706 is busy, perhaps occupied by a transmission from a legacy device, the entirety of the secondary-40 channel 708 is considered as busy and unavailable. Similarly, if even one of the four 20 MHz segments of the secondary-40 channel 706 is busy, perhaps occupied by a transmission from a legacy device, the entirety of the secondary-80 channel 710 is considered as busy and unavailable.

One or more embodiments of the present disclosure provide a transmitter that can allocate multiple channels within a bandwidth, which has been sensed as being free, irrespective of continuity. That is, according to embodiments of the present disclosure, after the transmitter senses a bandwidth as "free," the transmitter is able to allocate multiple contiguous channels. Additionally, after the transmitter senses a bandwidth as "free," the transmitter is able to allocate multiple non-contiguous channels. The notion of channel sensed "free" is dictated by a power or energy measurement at the receiver and depends on the type of transmission impinged on the receiver. The 802.11 specification defines this power that must be measured at the receiver to decide whether the channel is sensed "free" or "busy". No greater requirement is imposed than that specified in the IEEE 802.11 specification for receiver sensitivity.

Figure 8:
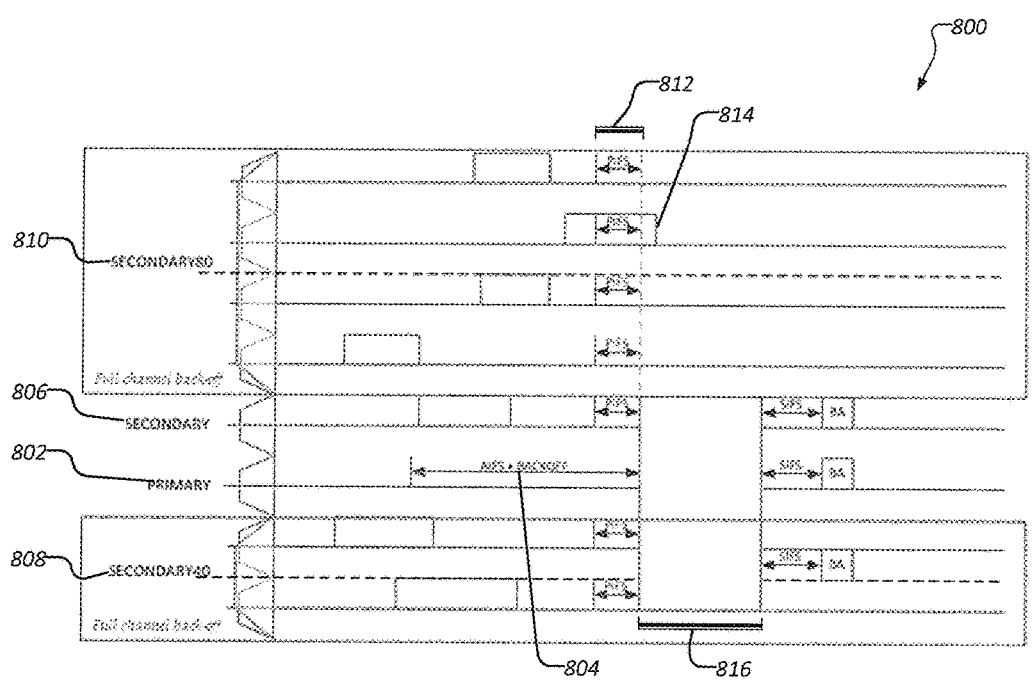
FIG. 8 illustrates a dynamic channel bandwidth bonding and access procedure in IEEE 802.11 in accordance with this disclosure.

FIG. 8 illustrates an example dynamic channel bandwidth channel bonding and access procedure in IEEE 802.11 systems according to this disclosure. The example of the dynamic channel bandwidth channel bonding and access procedure shown in FIG. 8 is for illustration only, and other dynamic channel bandwidth channel bonding and access procedures in embodiments of the present disclosure could have the same or similar configuration.

The dynamic channel bandwidth channel bonding procedure 800 is based on extending the channel sensing mechanism to all bands that are being considered for channel bonding. For example, to aggregate 160 MHz, the primary channel 802 goes through the full channel sensing protocol that includes an AIFS+back-off procedure 804. The AIFS+back-off procedure 804 is a carrier sense multiple access (CSMA) procedure during which the primary channel 802 must be sensed free. The secondary channel 806 having a bandwidth of 20 MHz, secondary-40 channel 808 and secondary-80 channel 810, are not held to the same sensing requirements as the primary channel 802. Instead, it is required that the secondary channels 806, 808, 810 are sensed free for a point coordination function inter-frame space (PIFS) duration 812 just before a back-off timer of the AIFS+back-off procedure 804 expires and the channel is sensed free. When the primary channel 802 and the secondary channels 806, 808, 810 are all sensed free at the transmitter during the PIFS duration 812, a TXOP on each of the channels 802, 806, 808, 810 would be initiated. However, in this example, the secondary-80 channel 810 comprises a busy channel segment 814 that was occupied during the PIFS duration 812. Because the sensing requirement are set-up to disallow transmission even if one of the 20 MHz channels of a secondary-80 channel 810 is sensed busy, the busy channel segment 814 disqualifies the entirety of the secondary-80 channel 810 from use. The fact that the busy channel segment 814 was busy during the PIFS duration 812 does not disqualify the use of the secondary channel 806 or use of the secondary-40 channel 808. Accordingly, a collective bandwidth of 80 MHz (the sum of bandwidths of primary channel 802, secondary channel 806, and secondary-40 channel 808) is utilized in a TXOP 816. The TXOP 816 includes transmitting a request to send (RTS) message to a destination, such as an access point. In this dynamic channel bandwidth channel bonding procedure 800, the RTS indicates a request for a bandwidth of 160 MHz comprising the channels 802, 806, 808, 810 that are sensed free. In return, the destination or access point can send a modified CTS that indicates that only the channels 802, 806, 808 (for a total of 80 MHz bandwidth) are clear to send even though the RTS requested 160 MHz. Dynamic channel bonding means that the destination is free to respond with a subset of channels indicated by the bandwidth indicator in the RTS. For a modified CTS response, the subset of channels must first be sensed free as explained above. This dynamic process accommodates scenarios where the bandwidth sensed free at the transmitter and receiver are different.

Figure 9:
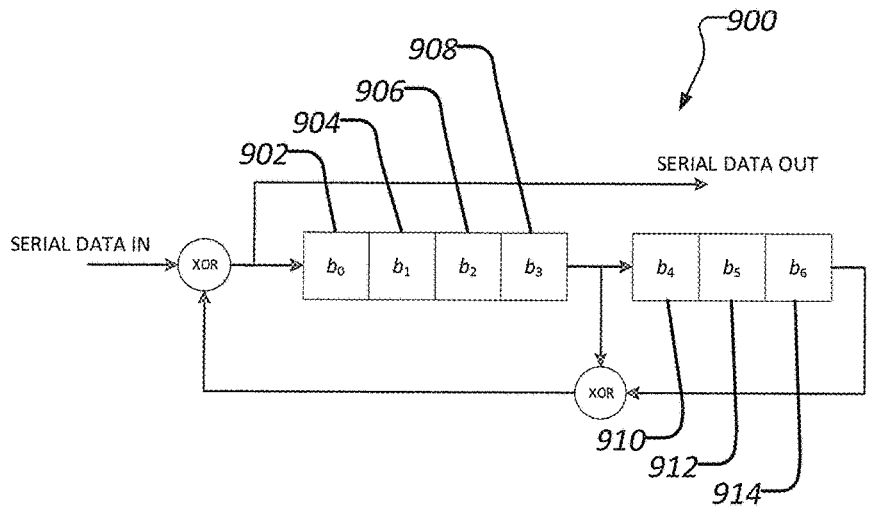
FIG. 9 illustrates a scrambling apparatus of an IEEE 802.11 transmitter in accordance with this disclosure.

FIG. 9 illustrates an example scrambling apparatus of an IEEE 802.11 transmitter according to this disclosure. The example of the scrambling apparatus shown in FIG. 9 is for illustration only, and other scrambling apparatus in embodiments of the present disclosure could have the same or similar configuration.

The scrambling apparatus 900 is configured to utilize two indicators to support the above-described channel bonding procedures. During a regular scrambling operation, the seven bits, b0 902, b1 904, b2 906, b3 908, b4 910, b5 912, and b6 914, are initialized pseudo-randomly in the scrambling apparatus 900. During a scrambling operation that supports the above-described channel bonding procedures, a first indicator of the two required indicators is a channel bandwidth indicator. The channel bandwidth indicator requires two bits to support 20 MHz, 40 MHz, 80 MHz, and 160 MHz. During a scrambling operation that supports the above-described channel bonding procedures, a second indicator of the two required indicators is a dynamic/static channel bandwidth operation indicator. The dynamic/static channel bandwidth operation indicator requires one bit. These three bits collectively required for the channel bandwidth indicator and the dynamic/static channel bandwidth operation indicator are embedded in three of the first seven initialization bits, b0 902, b1 904, and b2 906 of the scrambling sequence before the scrambling operation for the data bits in the RTS and CTS messages. The RTS and CTS are duplicated and transmitted on all channels that are considered for data transmission. In each replica of the RTS and CTS transmission, the three of the seven initialization bits of the scrambling sequence are used to indicate the channel bandwidth and which of the static mode and dynamic mode the channel bonding procedure is operating in.

As used herein, term "free" in the context of a channel is intended to mean that the protocol at a transmitter has set its state to "channel is free". Also, as used herein, a "cleared channel" refers to a channel that has been sensed free and subsequently has been reserved for data transmission using an RTS and CTS exchange between the transmitter and receiver. Further, as used herein, a "legacy device" is a device that operates in accordance with IEEE 802.11a, IEEE 802.11b, IEEE 802.11n, IEEE 802.11ac, or IEEE 802.11ah specifications. As used herein, a "non-legacy device" is a device that executes one or more of the newly disclosed protocols or a device that operates in accordance with an IEEE 802.11 standard that is newer that each of the IEEE 802.11a, IEEE 802.11b, IEEE 802.11n, IEEE 802.11ac, or IEEE 802.11ah specifications.

Figure 10:
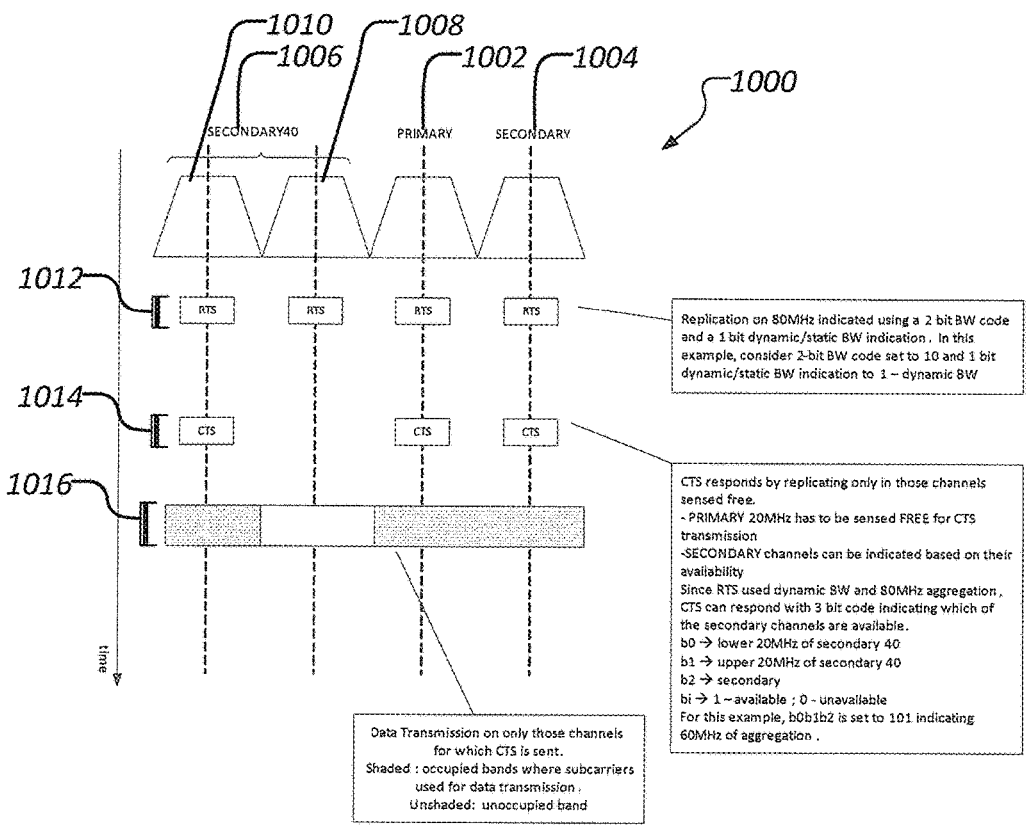
FIG. 10 illustrates a modified CTS mechanism for enabling non-contiguous channel operation in accordance with this disclosure.

FIG. 10 illustrates an example modified CTS mechanism for enabling non-contiguous channel operation according to this disclosure. The embodiment of the modified CTS mechanism shown in FIG. 10 is for illustration only, and other modified CTS mechanisms in embodiments of the present disclosure could have the same or similar configuration.

The modified CTS mechanism 1000 includes a primary channel 1002 having a bandwidth of 20 MHz, a secondary channel 1004 having a bandwidth of 20 MHz, and a secondary-40 channel 1006 having a bandwidth of 40 MHz (the sum of an upper first segment 1008 having a bandwidth of 20 MHz and a lower second segment 1010 having a bandwidth of 20 MHz). The modified CTS mechanism 1000 includes a source station (STA) or source access point (AP) gaining access to the channel and sensing primary and secondary channels free for a duration specified in the protocol. In this embodiment, the source is an AP and the destination is a STA. In alternative embodiments, the source and the destination can each be either an AP or a STA. With the primary channel 1002 and secondary channels 1004, 1006 sensed free, the AP transmits the RTS 1012 unmodified on the primary channel 1002 and secondary channels 1004, 1006 that were sensed free. One bit is used to indicate dynamic or static bandwidth operation and 2 bits are used to indicate the bandwidth itself, thereby accounting for a total of three bits out of the first seven bits of the scrambling sequence. When communicating with non-legacy devices, if the one bit to indicate dynamic or static bandwidth operation is set to dynamic bandwidth, it indicates that the STA can respond with a modified CTS that cannot be read by legacy devices. If a STA receives an RTS with dynamic bandwidth indication, then the STA can respond with a modified CTS and the CTS can use the first seven bits of the scrambling sequence to indicate which portion of the bandwidth signaled in the RTS can be used for data transmission. The number of bits of the scrambling sequence required for indicating choice of bandwidth in increments of 20 MHz depends on the bandwidth being aggregated and is indicated in the RTS.

If the RTS indicates a 40 MHz channel bandwidth, then the receiver responds with a CTS where one bit of the first seven initialization bits of the scrambling sequence is used to indicate whether the secondary channel is available or not. By convention, the first bit b0 can be used for initialization as shown below.

$$b_0 = \begin{cases} 0 & \text{if secondary channel is unavailable} \\ 1 & \text{if secondary channel is available} \end{cases}$$

By convention, each bit indicates a 20 MHz segment of the secondary channels starting from the secondary channel 1004, next the secondary-40 channel 1006, next the secondary-80 channel (not shown in FIG. 10) and where the number of bits used for such indication is set by the bandwidth signaled in the RTS 1012. For example, when RTS 1012 indicates an 80 MHz channel bandwidth, the receiver responds with a CTS with a three bit bitmap to indicate which of the three 20 MHz channels corresponding to secondary 20 or secondary 40 channels or channel segments other than the primary channel 1002 are available for transmission. The bitmap convention is shown below.

$$b_i = \begin{cases} 0 & \text{if unavailable} \\ 1 & \text{if available} \end{cases} \text{ for } i = 0, 1, 2$$

The 3-bit bitmap is carried in three of the 7 bits in the scrambling sequence initialization For purposes of illustration, consider that i=0 corresponds to the lower 20 MHz of secondary-40 channel 1006, second segment 1010, i=1 corresponds to the upper 20 MHz of secondary-40 channel 1006, first segment 1008, and i=2 corresponds to the secondary channel 1004. Scrambling bits 3-7 are not used to signal bandwidth in the CTS since the RTS indicated only 80 MHz channel bandwidth. The possible bitmaps that can be transmitted in the CTS is illustrated in Table 1 below. Accordingly, FIG. 10 is an example of 60 MHz aggregation with a modified CTS response using the bitmap 101.

TABLE 1 bitmap indicating available channels in the modified CTS response

| $b_0$ | $b_1$ | $b_2$ | Remark |
|---|---|---|---|
| 0 | 0 | 0 | None of the secondary channels are available |

TABLE 1-continued bitmap indicating available channels in the modified CTS response

| $b_0$ | $b_1$ | $b_2$ | Remark |
|---|---|---|---|
| 0 | 0 | 1 | 40 MHz aggregation |
| 1 | 0 | 0 | |
| 0 | 1 | 0 | |
| 1 | 0 | 1 | 60 MHz aggregation |
| 1 | 1 | 0 | |
| 0 | 1 | 1 | |
| 1 | 1 | 1 | 80 MHz aggregation |

In an alternative embodiment, when an RTS indicates a 160 MHz channel bandwidth, the receiver response with a CTS with a seven bit bitmap to indicate which of the seven 20 MHz channels or channel segments are available for transmission. The same bitmap convention used for 80 MHz RTS for indicated availability for each 20 MHz segment in secondary channel 1004, secondary-40 channel 1006, and secondary-80 channels. Further, CTS is transmitted and replicated only on channels selected for transmission. Accordingly, in the embodiment of FIG. 10, the CTS 1014 transmitted and replicated only on primary channel 1002, secondary channel 1004, and the lower channel segment 1010 of the secondary-40 channel 1006 when, as shown in FIG. 10, only 60 MHz of the 80 MHz indicated in the RTS is available at a STA or AP.

Next, transmission 1016 begins on cleared channels, namely, primary channel 1002, secondary channel 1004, and the lower channel segment 1010 of the secondary-40 channel 1006. When the RTS indicates a 80 MHz channel bandwidth and the receiver responds with a CTS with a three bit bitmap that indicates only 60 MHz of the 80 MHz are available as shown in FIG. 10, in the orthogonal frequency division multiplexing (OFDM) physical layer (PHY), the OFDM mask is set to 80 MHz bandwidth with 256 subcarriers. In the example shown in FIG. 10, since only 60 MHz of the 80 MHz are indicated in the CTS 1014, 96 subcarriers are left unused including the 64 subcarriers of the upper channel segment 1008 of the secondary 40 channel 1006.

Figure 11:
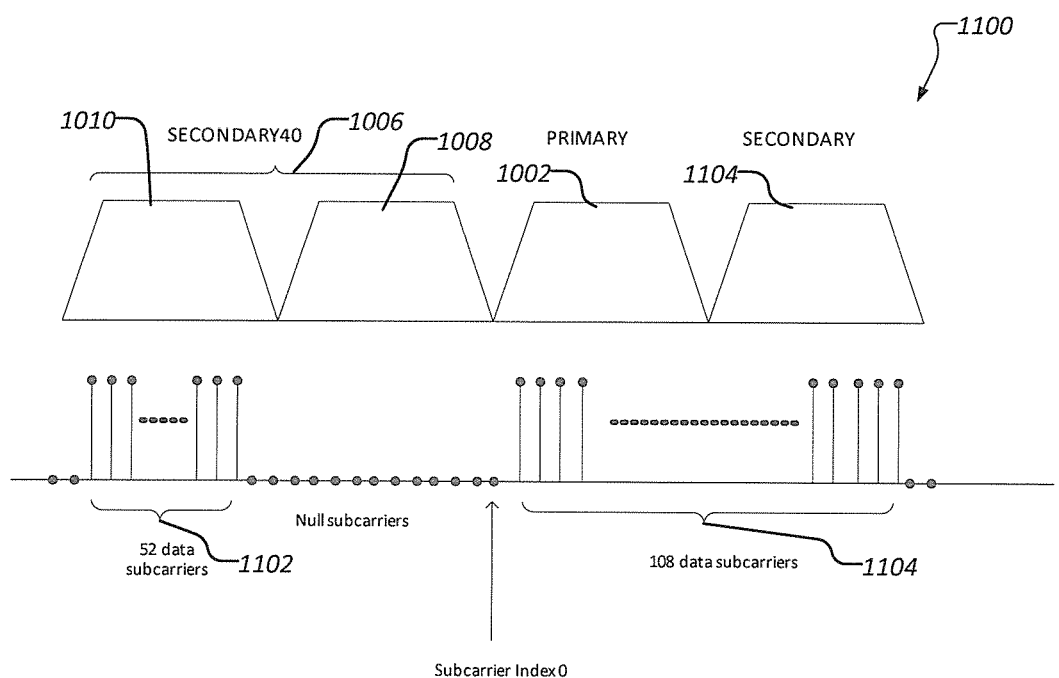
FIG. 11 illustrates an OFDM mask for 60 MHz bandwidth in accordance with this disclosure.

FIG. 11 illustrates an example OFDM mask according to this disclosure. The embodiment of the OFDM mask shown in FIG. 11 is for illustration only, and other OFDM masks in embodiments of the present disclosure could have the same or similar configuration.

The OFDM mask 1100 is for 60 MHz bandwidth aggregation with a modified CTS in response to 80 MHz aggregation RTS. Of the available channels, 52 data subcarriers 1102 of the lower 20 MHz channel segment 1010 of the secondary-40 channel 1006 and 108 data subcarriers 1104 of the primary channel 1002 and secondary channel 1004 can be used for a total of 160 data subcarriers with 60 MHz aggregation. The number of data subcarriers described above is only an example and, in some cases, more subcarriers may be nulled to avoid interference with bands that are not used in the aggregation.

Figure 12:
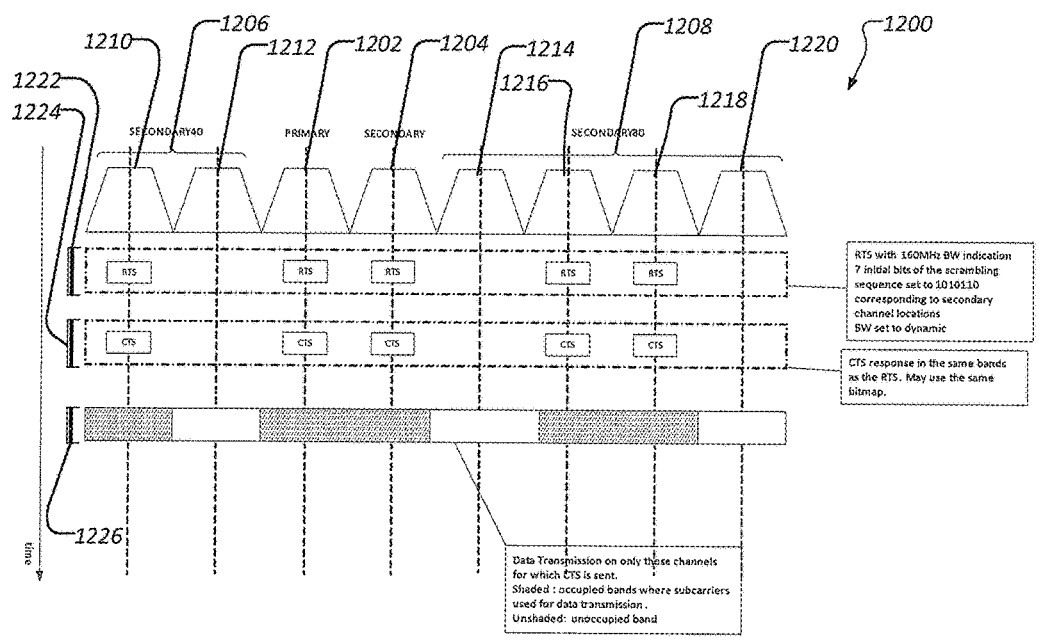
FIG. 12 illustrates a modified RTS and CTS mechanism in accordance with this disclosure.

FIG. 12 illustrates another example modified RTS and CTS mechanism according to this disclosure. The embodiment of the modified RTS and CTS mechanism shown in FIG. 12 is for illustration only, and other modified RTS and CTS mechanisms in embodiments of the present disclosure could have the same or similar configuration.

The modified RTS and CTS mechanism 1200 includes a primary channel 1202 having a bandwidth of 20 MHz, a secondary channel 1204 having a bandwidth of 20 MHz, a secondary-40 channel 1206 having a bandwidth of 40 MHz (the sum of a lower first segment 1210 having a bandwidth of 20 MHz and an upper second segment 1212 having a bandwidth of 20 MHz), and a secondary-80 channel 1208 having a bandwidth of 80 MHz (the sum of a first segment 1214 having a bandwidth of 20 MHz, a second segment 1216 having a bandwidth of 20 MHz, a third segment 1218 having a bandwidth of 20 MHz, and a fourth segment 1220 having a bandwidth of 20 MHz). The modified RTS and CTS mechanism 1200 includes a source station (STA) or source access point (AP) gaining access to the channel and sensing primary and secondary channels free for a duration specified in the protocol. In this embodiment, the source is an AP and the destination is a STA. In alternative embodiments, the source and the destination can each be either an AP or a STA. With the primary channel 1202 and secondary channels 1204, 1206, 1208 sensed free, the AP transmits the RTS 1222 with all of the first seven bits of the scrambling sequence used to indicate the channel bandwidth to an intended non-legacy receiver. The RTS 1222 is replicated on the channels used for the transmission, in the example of FIG. 12, namely, primary channel 1202, secondary channel 1204, first segment 1210 of secondary-40 channel 1206, second segment 1216 of secondary-80 channel 1208, and third segment 1218 of secondary-80 channel 1208.

The seven bits are used to indicate which of the channels other than the primary channel 1202 will be used for transmission. Each bit indicates availability of bandwidths in 20 MHz segments for channels other than the primary channel 1202. As an example convention, when a bit is set to 1, it indicates that a 20 MHz section of the secondary channel is available. The bitmap will allow indication of channel bandwidths up to 140 MHz. Including the primary channel 1202, which does not need to be indicated, this scheme and related convention and bitmap allows for an accounting of a total of 160 MHz of channel aggregation. The positions of the secondary channels 1204, 1206, 1208 relative to the primary channel 1202 follows the same convention as the channel type formats of IEEE 802.11. As such, the bitmap representative of the example of FIG. 12, a bitmap of 1010110, indicates that the first segment 1210 of the second 40 channel 1206, the secondary channel 1204, the second segment 1216 of secondary-80 channel 1208, and the third segment 1218 of secondary-80 channel 1208 are available and are to be aggregated for transmission 1226

When a STA receives RTS 1224, the STA responds with a modified CTS 1224 indicating all or a subset of the channels sensed free from the set of the channels indicated in the RTS 1222. The CTS 1224 also sets the first seven bits of the scrambling sequence as a bitmap to indicate the bandwidth that can be used for the transmission. The CTS 1224 is replicated only on channels selected for transmission, namely, the first segment 1210 of the second 40 channel 1206, the secondary channel 1204, the second segment 1216 of secondary-80 channel 1208, and the third segment 1218 of secondary-80 channel 1208. Next, transmission 1226 begins on the cleared channels using 160 MHz OFDM PHY with 512 subcarriers where the data subcarriers are localized to the channels chosen by the RTS.

Figure 13:
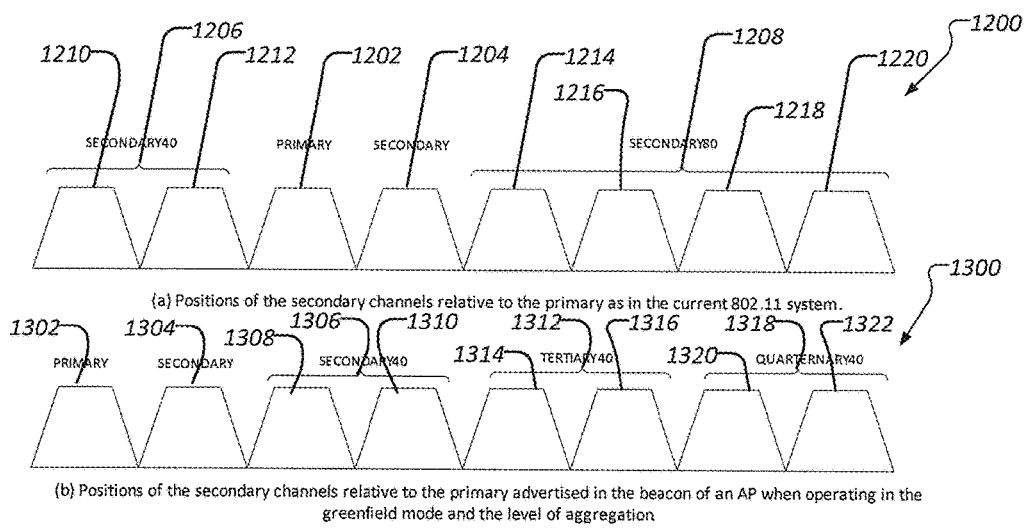
FIG. 13 illustrates a channel scheme for another RTS and CTS mechanism in accordance with this disclosure.

FIG. 13 illustrates an alternative channel scheme for another RTS and CTS mechanism according to this disclosure. The embodiment of channel scheme shown in FIG. 13 is for illustration only, and other channel schemes in embodiments of the present disclosure could have the same or similar configuration.

The channel scheme 1300 is compared to the channel scheme of FIG. 12. A greenfield operating mode in the 802.11 may allow for channel aggregation greater than 160

MHz. For example, with the total bandwidth that can be aggregated denoted as X MHz where X can take values from 20 MHz to the entire bandwidth YY MHz available in increments of 20 MHz. This total bandwidth is indicated by an AP in a beacon or is otherwise specified. Any bandwidth aggregating AP can use a bitmap in increments of 20 MHz or at an aggregation level set by the AP to indicate which of the XMHz is clear and is to be used for transmission in the RTS. If aggregation level is set at 20 MHz, an $$M = \left\lceil \frac{X}{20} \right\rceil$$

bit bitmap will be needed to indicate availability of the channels in 20 MHz increments and would be transmitted as a field in the RTS. The STA can indicate in the CTS using another bitmap to indicate a subset of the bandwidths indicated by the RTS that can be used for the transmission if dynamic bandwidth selection is allowed. CTS is replicated only on channels selected for transmission. Transmission begins on the cleared channels using appropriate OFDM PHY parameters.

In certain embodiments, relative positions of secondary channels with respect to the primary channel can be set based on a convention other than that currently used in IEEE 802.11 systems. An example of the channel scheme or convention currently used in 802.11 systems is shown section (a) of FIG. 13. However, other conventions with different levels of channel aggregation, such as multiple secondary 20 MHz channels or multiple secondary-40 MHz channels, can be easily adopted as well when operating in the greenfield mode.

Relative positions of the secondary channels with respect to the primary channel and the level of aggregation can be advertised by the AP in the beacon allowing for more dynamic configuration of the secondary channels with respect to the primary and can modify the level of aggregation differently in each advertisement from the AP. The example shown in section (b) of FIG. 13 illustrate that the secondary channel locations are specified as increasing channel numbers from the channel number corresponding to location of the primary channel along with the amount of aggregation allowed in each of the non-primary channels to be no more than 40 MHz so that all non-primary channels are either 20 MHz or 40 MHz. The AP can also indicate if the 40 MHz channels are treated as a single channel or can be signaled separately as individual 20 MHz channels. In this embodiment, the channel scheme 1300 includes a primary channel 1302 having a 20 MHz bandwidth, a secondary channel 1304 having a 20 MHz bandwidth, a secondary-40 channel 1306 having a 40 MHz bandwidth (the sum of a lower channel segment 1308 having a bandwidth of 20 MHz and an upper channel segment 1310 having a bandwidth of 20 MHz), a tertiary 40 channel 1312 having a 40 MHz bandwidth (the sum of a lower channel segment 1314 having a bandwidth of 20 MHz and an upper channel segment 1316 having a bandwidth of 20 MHz), and a quaternary 40 channel 1318 having a 40 MHz bandwidth (the sum of a lower channel segment 1320 having a bandwidth of 20 MHz and an upper channel segment 1322 having a bandwidth of 20 MHz).

Figure 14:
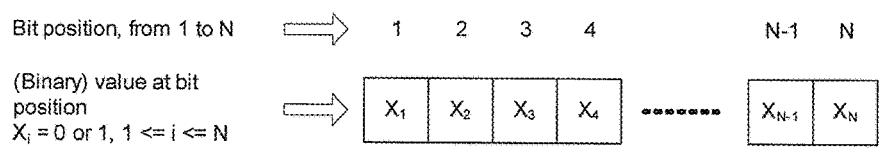
FIG. 14 illustrates a bitmap construction of another RTS and CTS mechanism in accordance with this disclosure.

FIG. 14 illustrates a bitmap construction of another RTS and CTS mechanism according to this disclosure. The embodiment of the bitmap construction shown in FIG. 14 is for illustration only, and other bitmap constructions in embodiments of the present disclosure could have the same or similar configuration.

The bitmap construction 1400 is configured for use with another RTS and CTS mechanism. The greenfield operating mode in the IEEE 802.11 may allow for channel aggregation up to a bandwidth of X MHz of the entire available bandwidth. For example, when X is 160 MHz, up to 160 MHz of the total bandwidth available can be used. Any aggregating STA/AP can indicate 160 MHz of bandwidth in increments of 20 MHz that is available in the 5 GHz UNII band for transmission. Since the 160 MHz of bandwidth can be non-contiguous and only $$M = \left\lceil \frac{X}{20} \right\rceil$$

bits of the total N bits can be used, the N bit information is represented using an enumerative source code which offers the best compression of information as described below.

Consider an N-bit binary number $X=\{X1, X2, \ldots, XN\}$ where each Xi can take on values 0 or 1 for $1 \leq i \leq N$. The N-bit binary number X is a bitmap whose construction is illustrated in FIG. 11. By convention, position 1 is the MSB position, i.e., X1 is the MSB, Position N is the LSB position, i.e., XN is the LSB. Now, consider a special case of this bitmap where M of the bit positions of X have a value 1, the rest have the value 0. Let the M bit positions be S1, S2 ... SM. Hence $X_{S_1}=X_{S_2}=\ldots=X_{S_M}=1$ and $X_i=0$ for all other i. Then the unique lexicographic index $i_S(\underline{X})$ of X is given by Equation (1) below.

$$i_S(X) = \sum_{k=1}^{N} X_k \binom{N-k}{M - \sum_{j=1}^{K-1} X_j} \quad (1)$$

$$= \sum_{l=1}^{M} X_{S_l} \binom{N-S_l}{M - \sum_{j=1}^{S_l-1} X_j}$$

$$= \sum_{l=1}^{M} \binom{N-S_l}{M - \sum_{j=1}^{S_l-1} X_j}$$

For sub-band indexing using enumerative source coding, consider a scenario where the base station (BS) or AP requests the STA or mobile station (MS) to report indices of best M of the N sub-bands that the MS prefers to receive its data on. To index the best M of the N sub-bands, the enumerative source coding scheme with the following re-interpretations can be used: first, $\underline{X}$ is the N-bit bit map, with position i indexing sub-band with index i, $1 \leq i \leq N$, second, $X_i=1$ implies that the Sub-band with index i is indicated as one of the "best-M" sub-bands, and third, $X_i=0$ implies that the Sub-band with index i is indicated as not one of the "best-M" sub-bands. The indices of M of these N sub-bands need to be indicated as the "best-M" sub-bands. Identify S1, S2 ... SM as indices of the best-M sub-bands to be indicated. Then the unique lexicographic index $i_S(\underline{X})$ of X is given by Equation (2) below.

$$i_S(X) = \sum_{l=1}^{M} \begin{pmatrix} N - S_l \\ M - \sum_{j=1}^{S_{l-1}} X_j \end{pmatrix} \quad (2)$$

$$\begin{pmatrix} S \\ M \end{pmatrix}$$

is the set of all M-combinations of a set S. Once the RTS is received, STA/AP will decode the preferred M bands using the following decoding algorithm for the enumerative source coding.

Let N be the number of sub-bands and M be the number of reported sub-bands whose selection bitmap is indicated by s and mapped to an index i given by enumerative source coding formula described above. The decoding logic is provided in the pseudo-code described below which provides the bitmap s with 1s indicating the index of chosen sub-band. In the code below, s indicates the sub-band selection bitmap, while i is the index of the best-M sub-band selection.

```
function s = BestMDecoding(N, M, i)
    s = zeros(1, N);
    for k = 1:N
        v = 0;
        if Σ_{j=1}^{k-1} s(k) ≥ M
            break ; //Break out of FOR loop
        end
        if (N − k) ≥ M − Σ_{j=1}^{k-1} s(k)
            v = ( N − k
                  M − Σ_{j=1}^{k-1} s(k) )
        end
        if i > v
            s(k) = 1;
        else
            s(k) = 0;
        end
        i = i − s(k) * v;
    end
```

The STA/AP can indicate in the CTS, a subset of the bandwidth indicated by the RTS that are sensed "free" and can be used for transmission using a bitmap. Next, enumerative source coding can be used to compress information in the bitmap. The compressed bitmap may be transmitted in the CTS. Next, the CTS is duplicated only on channels selected for transmission and transmission begins on the cleared channels.

Figures 15, 16:
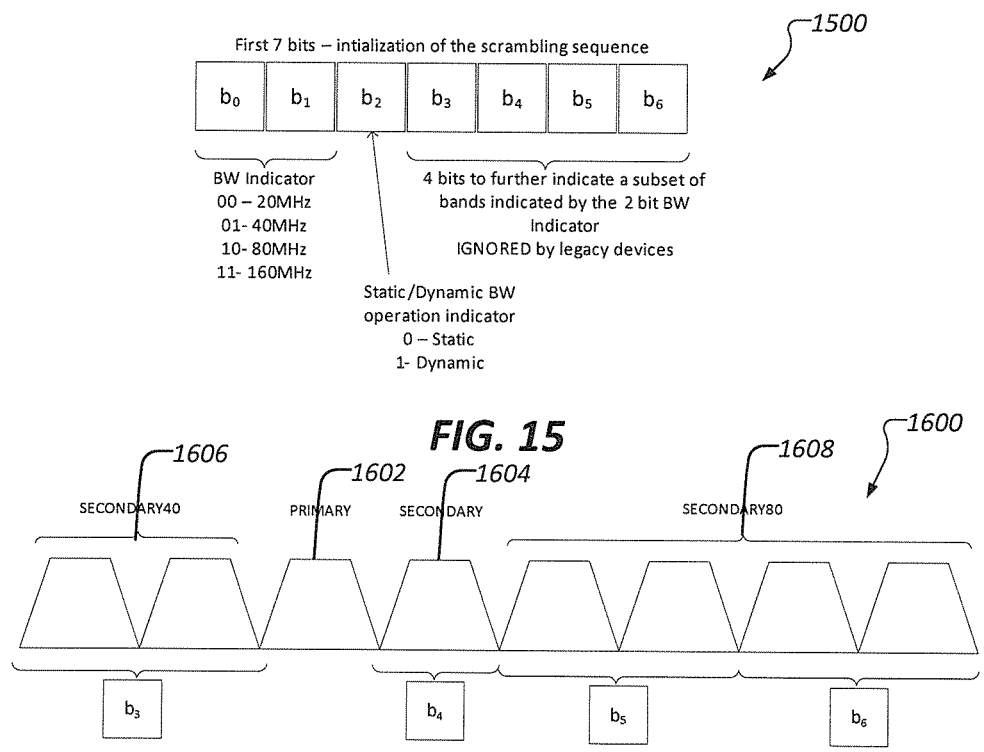
FIG. 15 illustrates initializing bits of a scrambling sequence of another RTS and CTS mechanism in accordance with this disclosure.
FIG. 16 illustrates a channel scheme for another RTS and CTS mechanism in accordance with this disclosure.

FIG. 15 illustrates initializing bits of a scrambling sequence of another RTS and CTS mechanism according to this disclosure. The embodiment of the initializing bits shown in FIG. 15 is for illustration only, and other initializing bits of a scrambling sequence in embodiments of the present disclosure could have the same or similar configuration.

The initializing bits of a scrambling sequence 1500 are for a modified RTS and CTS mechanism for enabling non-contiguous channel operation in legacy and mixed mode operating environments. The modified RTS and CTS mechanism that utilizes the initializing bits of the scrambling sequence 1500 can begin with a source STA or AP gaining access to the channel and has sensed primary and secondary channels free for the duration specified in the protocol. In this embodiment, it is assumed that the source is an AP while the destination is an STA although this is not a restriction. Next, the AP transmits a modified RTS to non-legacy devices while ensuring that legacy devices still understand that this RTS is overloading the first 7 bits of the scrambling sequence 1500. Legacy devices still see the one bit to indicate dynamic/static bandwidth operation and two bits to indicate bandwidth for a total of three bits out of the first seven bits of the scrambling sequence as shown in FIG. 15 but will ignore the remaining four bits of seven bit scrambling sequence initialization. If the intended receiver of the RTS is a device that can support non-contiguous channel operation, it will use the remaining four bits to study how many non-contiguous segments are being bonded. When the two bit bandwidth indication indicates 80 MHz total bandwidth, then three out of the four remaining bits in the scrambler initialization sequence are used as a bitmap to indicate the true total number of channels bonded in addition to the primary so that 40 MHz and 60 MHz non-contiguous channel bonding is supported. An example of the three bit bitmap is shown in Table 1. The last bit in the seven bit initialization is ignored.

FIG. 16 illustrates a channel scheme for another RTS and CTS mechanism according to this disclosure. The embodiment of the channel scheme shown in FIG. 16 is for illustration only, and other channel schemes in embodiments of the present disclosure could have the same or similar configuration.

The RTS and CTS mechanism described above with regard to FIG. 15 comprises a channel scheme 1600. When the two bit bandwidth indication indicates 160 MHz channel bandwidth, the four remaining bits in the scrambler initialization sequence 1500 are used to support a combination of channels bonded in addition to the primary channel 1602. If four bits are used as a bitmap, then a secondary channel 1604 of 20 MHz bandwidth and a secondary-40 channel 1606 each use one bit while a secondary-80 channel 1608 uses two bits to indicate individual 40 MHz segments of the total 80 MHz as shown in FIG. 16. Using these four bits as a bitmap supports 40 MHz, 60 MHz, 80 MHz, 100 MHz, 120 MHz, 140 MHz and 160 MHz of non-contiguous channel bonding. An example of the bitmap values and the associated associations is shown in Table 2. Table 2 is only an example and does not preclude alternative embodiments utilizing different bitmap values than those of Table 2. Other variations of the bitmap may be constructed by disallowing indication of bandwidths below 80 MHz when 160 MHz bandwidth indicator is used, in which case the table can be re-written or some rows in Table 2 may be disallowed.

TABLE 2 bitmap indicating different channel aggregation bandwidths using four bits of the scrambling sequence initialization

| $b_3$ | $b_4$ | $b_5$ | $b_6$ | Remark |
|---|---|---|---|---|
| 0 | 0 | 0 | 0 | Disallowed or no secondary used |
| 0 | 1 | 0 | 0 | 40 MHz channel aggregation |
| 1 | 0 | 0 | 0 | 60 MHz channel aggregation |
| 0 | 0 | 1 | 0 | |
| 0 | 0 | 0 | 1 | |
| 1 | 1 | 0 | 0 | 80 MHz channel aggregation |
| 0 | 1 | 1 | 0 | |
| 0 | 1 | 0 | 1 | |

TABLE 2-continued bitmap indicating different channel aggregation bandwidths using four bits of the scrambling sequence initialization

| $b_3$ | $b_4$ | $b_5$ | $b_6$ | Remark |
|---|---|---|---|---|
| 1 | 0 | 1 | 0 | 100 MHz channel aggregation |
| 1 | 0 | 0 | 1 | |
| 0 | 1 | 1 | 1 | |
| 1 | 1 | 1 | 0 | 120 MHz channel aggregation |
| 1 | 1 | 0 | 1 | |
| 0 | 1 | 1 | 1 | |
| 1 | 0 | 1 | 1 | 140 MHz channel aggregation |
| 1 | 1 | 1 | 1 | 160 MHz channel aggregation |

Figure 17:
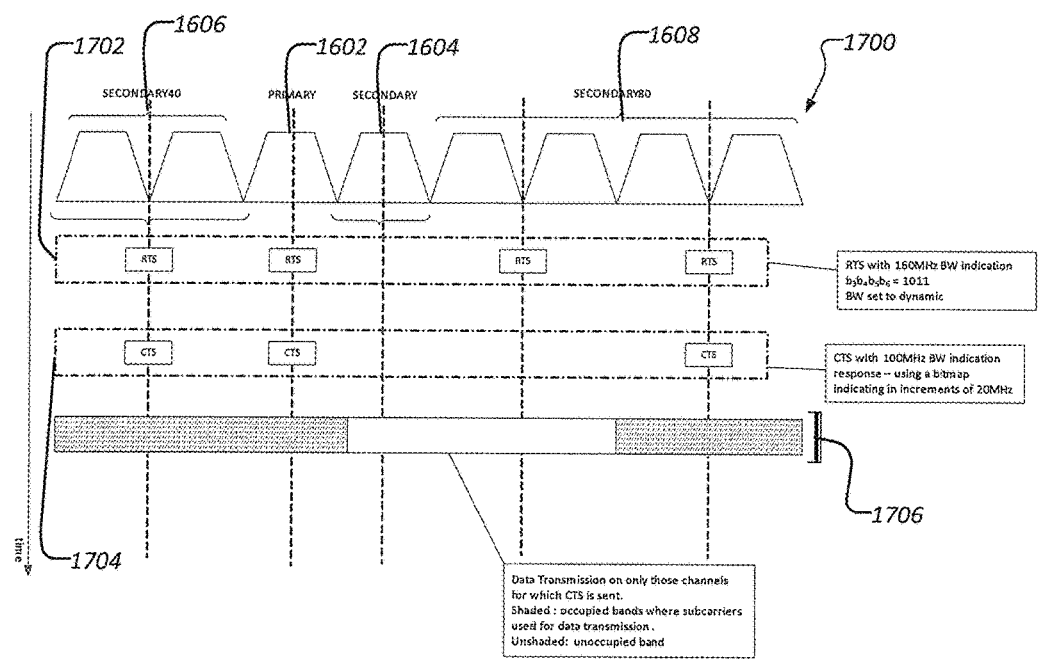
FIG. 17 illustrates another RTS and CTS mechanism in accordance with this disclosure.

FIG. 17 illustrates another RTS and CTS mechanism according to this disclosure. The embodiment of the RTS and CTS mechanism shown in FIG. 17 is for illustration only, and other RTS and CTS mechanisms in embodiments of the present disclosure could have the same or similar configuration.

An RTS and CTS mechanism 1700 associated with the discussion of FIGS. 15 and 16 above is illustrated. RTS is duplicated only on channels selected for transmission as illustrated in FIG. 17. RTS 1702 is duplicated on all channels indicated by the two bits bandwidth indicator. In some cases, the STA or AP will sense the entire bandwidth free before transmitting RTS 1702. The CTS 1704 response can vary depending on whether the dynamic or static bandwidth operation bit is set to 0 or 1. When the dynamic or static bandwidth operation bit is set to indicate static operation ($b_2$=0 in FIG. 15), the CTS 1704 response is transmitted only on the aggregated channels indicated by the seven initialization bits in the scrambling sequence indicated by the RTS 1702 and is transmitted only when all the aggregated channels are sensed free. When the dynamic or static bandwidth operation is set to indicate dynamic operation ($b_2$=1 in FIG. 15), the CTS 1702 response is transmitted only on a subset of channels indicated by the seven initialization bits in the scrambling sequence indicated by the RTS 1702 that are sensed free. In an alternative embodiment, a CTS response can be encoded the same way as the RTS bandwidth information is encoded in the first seven initialization bits of the scrambling sequence as shown in FIG. 15. In another alternative embodiment, a CTS response can be encoded differently and can use three bits as a bitmap out of the seven bits scrambling sequence initialization (Table 1) and a seven bit bitmap for 160 MHz. CTS 1704 is duplicated only on channels selected for transmission 1706 as shown in FIG. 17.

Transmission 1706 begins on the cleared channels using appropriate transmission mask. When the RTS 1702 indicates a 160 MHz channel bandwidth and the CTS 1704 responds with a bitmap that indicates only 100 MHz of the 160 MHz are available as shown in FIG. 17, the OFDM PHY mask is set to 160 MHz bandwidth with 512 subcarriers. Since only 100 MHz of the 160 MHz are indicated in the CTS 1704, 244 subcarriers are left unused including the 64 subcarriers of the secondary channel 1604 and the 108 subcarriers of the lower 40 MHz of the secondary-80 channel 1608. Of the available channels, 160 subcarriers of the 60 MHz aggregation using secondary-40 channel 1606+ primary channel 1602 and 108 subcarriers of the upper 40 MHz of secondary-80 channel 1608 can be used for a total of 268 data subcarriers with 100 MHz aggregation. The number of data subcarriers used is only an example and other numbers of subcarriers may be used in other embodiments. In some cases, more subcarriers may be nulled to avoid interference to the bands that are not used in the aggregation.

After a source AP or STA gains channel access using the appropriate sensing rules that govern both primary and secondary channels of a given bandwidth, the source can initiate a transmission by transmitting a clear-to-transmit message where the recipient address is the same as that of the sources transmitted address. This message, called the CTS-2-SELF, is transmitted over the cleared channels using a duplicated OFDM structure (where the duplication is in units of 20 MHz). After transmitting the CTS-2-SELF message, the source can initiate a PPDU transmission over the cleared channels addressed to a single destination in case of a SU-PPDU and multiple destinations in case of a MU-PPDU. The CTS-2-SELF message can use the first seven bits of the scrambling sequence to indicate which portion of the bandwidth signaled is to be used for data transmission.

Figure 18:
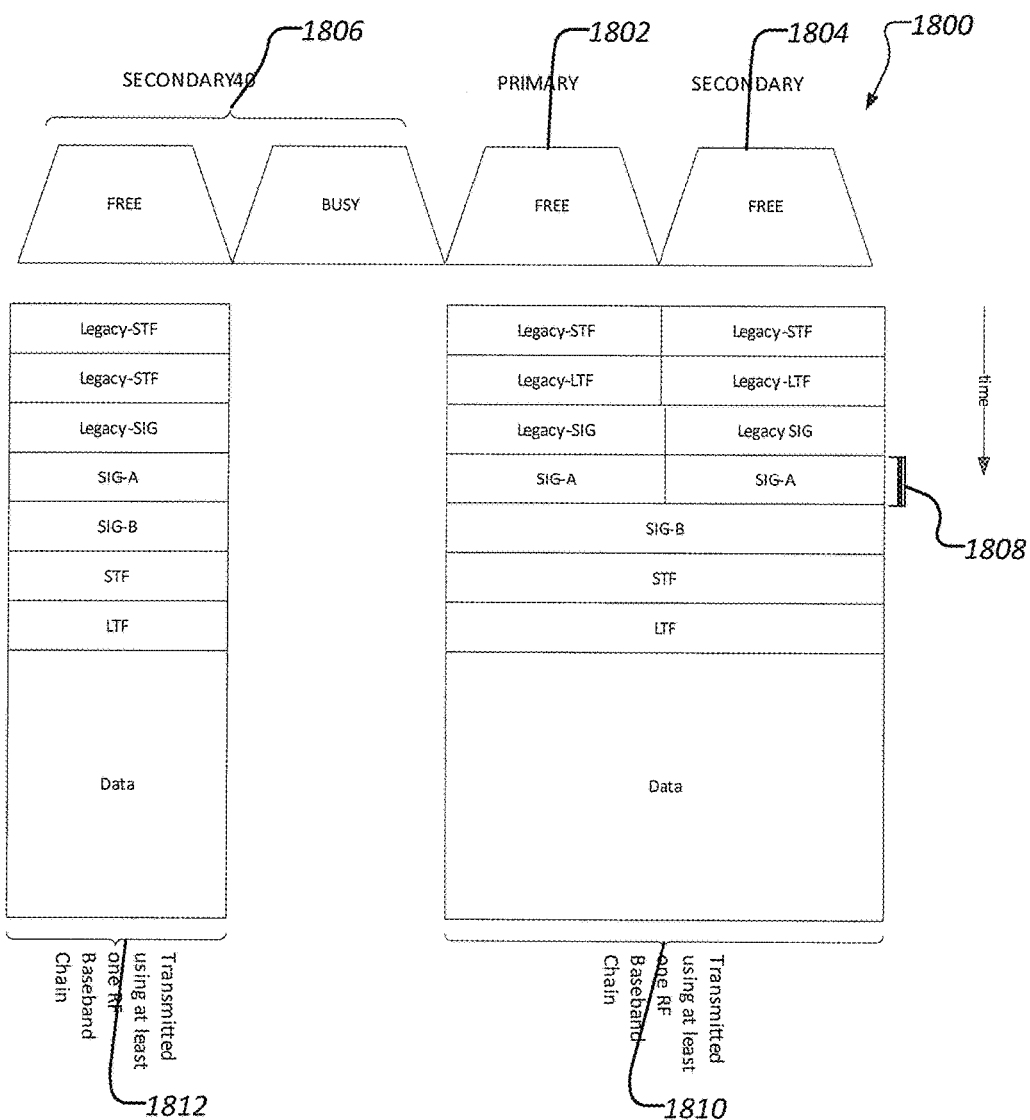
FIG. 18 illustrates a channel scheme for yet another RTS and CTS mechanism in accordance with this disclosure.

FIG. 18 illustrates a channel scheme for another RTS and CTS mechanism according to this disclosure. The embodiment of the channel scheme shown in FIG. 18 is for illustration only, and other channel schemes in embodiments of the present disclosure could have the same or similar configuration.

A channel scheme 1800 comprises a primary channel 1802, a secondary channel 1804, and a secondary-40 channel 1806. In an embodiment of an RTS and CTS mechanism that utilizes the channel scheme 1800, after a source AP or STA gains channel access using the appropriate sensing rules that govern both primary and secondary channels of a given bandwidth, the source can initiate a PPDU transmission by signaling the bandwidth used in the physical layer convergence protocol (PLCP) header's signaling fields. The PLCP header's signaling field identified as SIG-A 1808 including the legacy field is transmitted over the cleared channels using a duplicated OFDM structure where the duplication is in units of 20 MHz.

In certain embodiments, the source can use multiple baseband and radio frequency (RF) chains to transmit PPDU using the different non-contiguous segments of the cleared channels. Each baseband RF chain can transmit a SU or MU OFDM PPDU using 20 MHz, 40 MHz, 80 MHz, or 160 MHz. A contiguous segment of the cleared channel that is 20 MHz, 40 MHz, 80 MHz, or 160 MHz uses one baseband and radio frequency (RF) chain to transmit the SU or MU OFDM PPDU where the RF chain is tuned to the center frequency of the bandwidth used. When a contiguous segment of the clear channel is not one of 20 MHz, 40 MHz, 80 MHz, or 160 MHz, multiple baseband RF chains are used to conform to the OFDM PPDU definition for the standard bandwidths namely, 20 MHz, 40 MHz, 80 MHz, or 160 MHz, such that the total number of baseband or RF chains used is equal to the contiguous segment bandwidth sensed free. Non-contiguous segments use different base-band and radio frequency (RF) chains. The destination needs as many RF chains as the source to receive the data where each RF chain is tuned to one of the center frequencies used by the source to transmit the PPDU. The RF chains of the destination are tuned to the center frequencies used by the source to transmit the PPDU. FIG. 18 illustrates a specific example of a PPDU transmission over 60 MHz channel using two RF chains, a first RF chain 1810 of 40 MHz and a second RF chain 1812 of 20 MHz.

In certain embodiments, a portion of the cleared channel that is 20 MHz, 40 MHz, 80 MHz, or 160 MHz is indicated for a particular destination by the source and is transmitted using an OFDM PPDU on a baseband/RF chain at the source. Segments to different users may be contiguous or non-contiguous. That is, the allocated bandwidth can be selected irrespective of continuity of the bandwidths. The bandwidth the total allocation and the different portions of the total bandwidth along with their destination addresses are signaled in the physical layer convergence protocol (PLCP) header's signaling fields. The PLCP header's signaling field is transmitted over the cleared channels using a duplicated OFDM structure where the duplication is in units of 20 MHz. For the transmission illustrated in FIG. 18, the 40 MHz segment can be allocated to a first STA and the 20 MHz segment can be allocated to a second or different STA.

Figure 19:
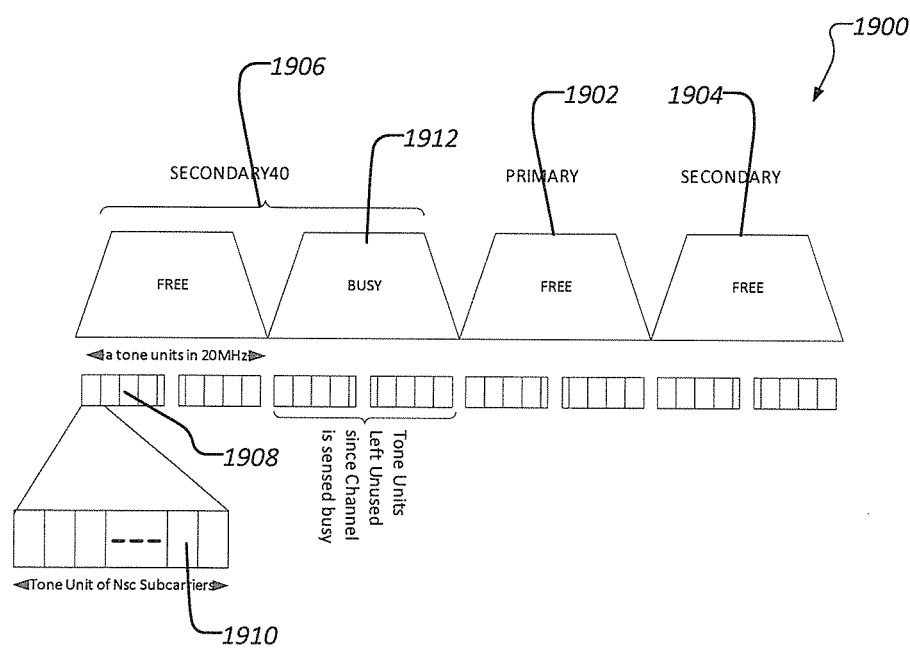
FIG. 19 illustrates a channel scheme for still another RTS and CTS mechanism in accordance with this disclosure.

FIG. 19 illustrates a channel scheme for another RTS and CTS mechanism according to this disclosure. The embodiment of the channel scheme shown in FIG. 19 is for illustration only, and other channel schemes in embodiments of the present disclosure could have the same or similar configuration.

A channel scheme 1900 comprises a primary channel 1902, a secondary channel 1904, and a secondary-40 channel 1906. In an embodiment of an RTS and CTS mechanism that utilizes the channel scheme 1900, the PPDU transmission on the cleared channels uses an OFDM PHY where the OFDM mask is set to the sensing bandwidth. The sensing bandwidth is the total bandwidth sensed for transmission and cleared bandwidth is a subset of the sensing bandwidth that are unoccupied (free for transmission). The FFT/IFFT size is set to that of sensing bandwidth. Each 20 MHz of the bandwidth is made up of a tone units 1908 where each tone unit contains $N_{SC}$ subcarriers 1910. For example, 20 MHz segment is made up of nine tone units where each tone unit contains 26 subcarriers and DC and guard subcarriers. When a particular 20 MHz segment 1912 in the sensing bandwidth is not sensed free, then those tone units that are co-incident with the location of the 20 MHz segment 1912 sensed busy are set to zero and not used.

Figure 20:
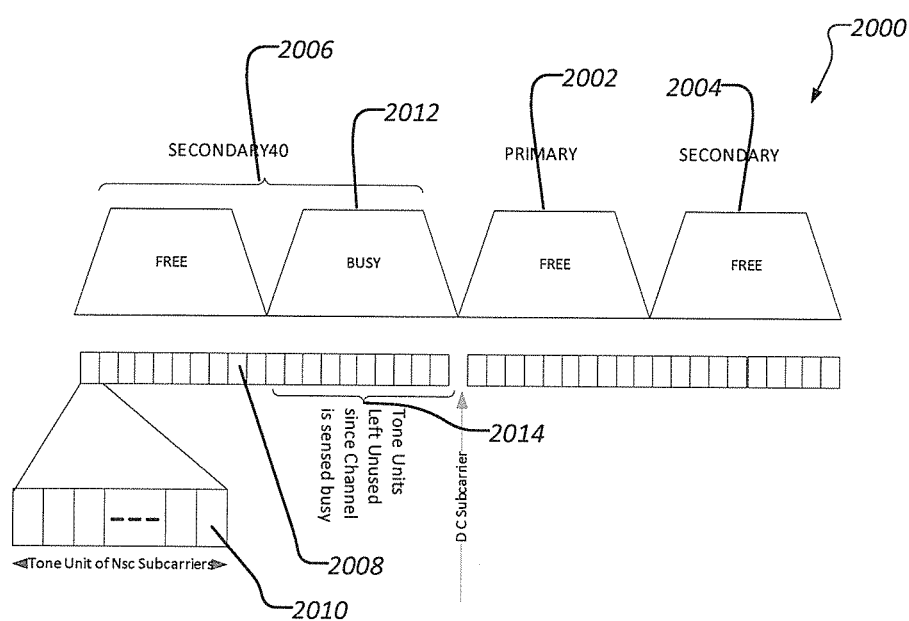
FIG. 20 illustrates a channel scheme for another RTS and CTS mechanism in accordance with this disclosure.

FIG. 20 illustrates a channel scheme for another RTS and CTS mechanism according to this disclosure. The embodiment of the channel scheme shown in FIG. 20 is for illustration only, and other channel schemes in embodiments of the present disclosure could have the same or similar configuration.

A channel scheme 2000 comprises a primary channel 2002, a secondary channel 2004, and a secondary-40 channel 2006. In an embodiment of an RTS and CTS mechanism that utilizes the channel scheme 2000, the PPDU transmission on the cleared channels uses an OFDM PHY where the OFDM mask is set to the sensing bandwidth. The sensing bandwidth is the total bandwidth sensed for transmission and cleared bandwidth is a subset of the sensing bandwidth that are unoccupied (free for transmission). The FFT/IFFT size is set to that of sensing bandwidth. The sensing bandwidth is made up of multiple tone units 2008 each containing $N_{SC}$ subcarriers 2010. When a particular segment $BW_x$ 2012 of the bandwidth is sensed busy, then x tone units that are coincident with the location of the $BW_x$ 2012 are set to zero and not used. The number of nulled tone units 2014, x can be defined as $$x = \left\lceil \frac{BW_x}{N_{sc}} \right\rceil.$$

For example, when 20 MHz segment 2012 is sensed busy and a tone unit is 26 subcarriers, thirteen tone units that are coincident with the 20 MHz segment sensed busy are unused. The data tone units can be allocated to the same or different STAs. In some cases, different STAs may be multiplexed on data tone units that are non-contiguous. In mixed mode transmissions, the legacy fields like the Legacy-Short Training Fields (L-STF), the legacy-long training fields (L-LTF), the legacy Signal fields (L-SIG) and the SIG-A may not be transmitted in the channels not sensed free for transmission.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus capable of establishing a data transmission bandwidth between a transmitting node and a receiving node, the apparatus comprising:
   one or more antenna configured to communicate data; and
   processing circuitry configured to:
      sense one or more free channels within a data transmission bandwidth comprising multiple channels; and
      establish a negotiated data transmission bandwidth using at least one of the one or more free channels irrespective of continuity of frequency of the one or more free channels.

2. The apparatus of claim 1, wherein the processing circuitry is configured to negotiate the data transmission bandwidth by sending a request to send (RTS) message to a receiving node, the RTS message indicating the data transmission bandwidth to be considered for use in subsequent data transmission.

3. The apparatus of claim 2, wherein the indicating the data transmission bandwidth comprises utilizing a subset of a seven bit scrambling sequence initialization, wherein the subset is configured to indicate at least one of: a size of the data bandwidth or a location of the free channels.

4. The apparatus of claim 3, wherein at least one of:
   the first three bits of the scrambling sequence initialization comprise a two bit indicator adapted to indicate one of four different bandwidth choices and a one bit indicator adapted to indicate whether the indicated bandwidth is fixed for a static mode or a variable for a dynamic mode;
   the last four bits of the scrambling sequence initialization are adapted to indicate a subset of the bandwidth indicated in the said two bit indicator, and wherein
      all seven bits of the scrambling sequence initialization are used as a bitmap to indicate which seven 20 MHz segments are to be used, and wherein
      all 20 MHz segments refer to channels other than a primary 20 MHz channel;
   wherein the RTS is duplicated on the channels indicated by the two bit indicator; or
   the RTS is duplicated only on the channels selected for a data transmission.

5. The apparatus of claim 2, wherein the processing circuitry is configured to, in response to sending the RTS message, receive a clear to send (CTS) message from the receiving node, the CTS message configured to indicate the channel bandwidth considered for use in data transmission.

6. The apparatus of claim 5, wherein at least one of:
a bandwidth indicator of the CTS message indicates a smaller channel bandwidth than the bandwidth indicated by the RTS message;
a bandwidth indicator transmitted indicates a subset of the bands indicated by the RTS message;
a bit bitmap associated with the CTS message indicates 20 MHz segments other than a primary 20 MHz channel; or
the CTS message is duplicated only on the channels selected for data transmission.

7. The apparatus of claim 6, wherein the processing circuitry is configured to, in response to sending the RTS message, after receiving the CTS message, begin data transmission on the channels indicated in the CTS message.

8. An apparatus comprising:
one or more antenna configured to communicate data; and
processing circuitry configured to:
  indicate an aggregation level to all nodes capable of transmitting and receiving data, and
  at least one of: use the aggregation level to indicate a minimum bandwidth segment that should be individually indicated when negotiating a channel bandwidth; or indicate the aggregation level along with positions of secondary channels relative to a primary channel.

9. The apparatus of claim 8, wherein the processing circuitry is configured to transmit, via the one or more antenna, a request to send (RTS) message, the RTS message comprising the aggregation level set by the processing circuitry to indicate a portion of data transmission bandwidth comprising multiple channels is clear and available to be used for transmission.

10. The apparatus of claim 9, wherein, when the aggregation level is set at 20 MHz, at least one field in the RTS message includes a first bitmap, the first bitmap comprising an $$M = \lceil \frac{x}{20} \rceil$$

bit bitmap is used to indicate availability of the channels in 20 MHz increments.

11. The apparatus of claim 9, wherein, in response to transmitting the RTS message, the processing circuitry receives a clear to send (CTS) message, the CTS message comprising a second bitmap configured to indicate a subset of the bandwidths indicated by the RTS message that are available to be used for the transmission when dynamic bandwidth selection is allowed.

12. The apparatus of claim 11, wherein at least one of:
a bandwidth indicator of the CTS message indicates a smaller channel bandwidth than the bandwidth indicated by the RTS message;
a bandwidth indicator transmitted indicates a subset of the bands indicated by the RTS message;
a bit bitmap associated with the CTS message indicates 20 MHz segments other than a primary 20 MHz channel; or
the CTS message is duplicated only on the channels selected for data transmission.

13. The apparatus of claim 11, wherein the processing circuitry is configured to, in response to sending the RTS message, after receiving the CTS message, begin data transmission on the channels indicated in the CTS message.

14. The apparatus of claim 11, wherein relative positions of a secondary channel with respect to a primary channel are set based on a convention or other conventions with different levels of channel aggregation.

15. The apparatus of claim 14, wherein the processing circuitry is configured to at least one of:
transmit, via the one or more antenna, a beacon comprising an advertisement of relative positions of the secondary channel with respect to the primary channel and the aggregation level, allowing for more dynamic configuration of the secondary channels with respect to the primary channels;
modify the aggregation level in each advertisement; or
indicate when 40 MHz channels are treated as a single channel or are signaled separately as individual 20 MHz channels.

16. An apparatus comprising:
one or more antenna configured to communicate data; and
processing circuitry configured to:
  in response to completing a negotiation for a data transmission bandwidth comprising a plurality of channels, select a subset of one or more channels sensed as free within the data transmission bandwidth, and
  apply a transmission mask configured to enable transmission of the data on the selected subset and not transmit data on a portion of the one or more channels sensed as free that is not within the subset.

17. The apparatus of claim 16, wherein the processing circuitry is configured to apply the transmission mask by nulling the data transmission on at least one sub-carrier.

18. The apparatus of claim 16, wherein the processing circuitry is configured to apply the transmission mask by transmitting portions of the data over different antenna.

19. The apparatus of claim 18, wherein the processing circuitry is configured to transmit a first portion of the data over a first antenna and a second portion of the data is transmitted over a second antenna.

20. The apparatus of claim 16, wherein the processing circuitry is configured to transmit the data after a transmission of a clear to send (CTS) message, the CTS message configured to indicate the channel bandwidth considered for use in data transmission and transmitted in response to receiving a request to send (RTS) message, the RTS message indicating the data transmission bandwidth to be considered for use in subsequent data transmission.

* * * * *